United States Patent
Barany et al.

(10) Patent No.: US 9,084,142 B2
(45) Date of Patent: Jul. 14, 2015

(54) ACTIVATING AND DEACTIVATING SEMI-PERSISTENT SCHEDULING FOR AN LTE VOIP RADIO BEARER

(71) Applicant: QUALCOMM Incorporated, San Diego, CA (US)

(72) Inventors: Peter Anthony Barany, San Diego, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 13/633,828

(22) Filed: Oct. 2, 2012

(65) Prior Publication Data

US 2013/0083702 A1    Apr. 4, 2013

Related U.S. Application Data

(60) Provisional application No. 61/542,713, filed on Oct. 3, 2011.

(51) Int. Cl.
*H04W 28/06* (2009.01)

(52) U.S. Cl.
CPC .................................. *H04W 28/06* (2013.01)

(58) Field of Classification Search
None
See application file for complete search history.

(56) References Cited

U.S. PATENT DOCUMENTS

| | | | |
|---|---|---|---|
| 7,948,913 B1 | 5/2011 | Dinan | |
| 8,009,606 B2 | 8/2011 | Seo et al. | |
| 8,059,632 B2 | 11/2011 | Xu | |
| 2006/0198324 A1* | 9/2006 | Nerses et al. | 370/260 |
| 2007/0165635 A1* | 7/2007 | Zhang et al. | 370/390 |
| 2009/0003282 A1* | 1/2009 | Meylan et al. | 370/331 |
| 2009/0274107 A1 | 11/2009 | Park et al. | |
| 2010/0105390 A1* | 4/2010 | Ishii | 455/436 |
| 2011/0182226 A1* | 7/2011 | Jin et al. | 370/312 |

(Continued)

FOREIGN PATENT DOCUMENTS

| | | |
|---|---|---|
| JP | 2010539847 A | 12/2010 |
| JP | 2012523146 A | 9/2012 |

(Continued)

OTHER PUBLICATIONS

International Search Report and Written Opinion—PCT/US2012/000505—ISA/EPO—Jan. 31, 2013.

(Continued)

*Primary Examiner* — Ayaz Sheikh
*Assistant Examiner* — Peter Chau
(74) *Attorney, Agent, or Firm* — Arent Fox LLP

(57) ABSTRACT

A method, an apparatus, and a computer program product for wireless communication are provided. The apparatus determines an operational state of a header compressor or a header decompressor by determining a transition between different operational states associated with the header compressor and/or by determining a transition between different operational states associated with the header decompressor. A persistent scheduling mode is changed in response to a change in the operational state of the header compressor. The persistent scheduling mode may be changed by activating uplink persistent scheduling when the operational state of the header compressor changes from a first order state to a second order state, and/or by deactivating the uplink persistent scheduling when the operational state of the header compressor exits the second order state.

59 Claims, 18 Drawing Sheets

(56) References Cited

U.S. PATENT DOCUMENTS

| | | | |
|---|---|---|---|
| 2011/0223924 A1* | 9/2011 | Lohr et al. | 455/450 |
| 2012/0014344 A1 | 1/2012 | Yu et al. | |
| 2012/0069805 A1* | 3/2012 | Feuersanger et al. | 370/329 |
| 2012/0155416 A1 | 6/2012 | Zhang et al. | |
| 2012/0201205 A1* | 8/2012 | Gopalakrishnan et al. | 370/329 |

FOREIGN PATENT DOCUMENTS

| | | | |
|---|---|---|---|
| KR | 20080031779 A | 4/2008 | |
| KR | 20120006496 A | 1/2012 | |
| WO | 2008041805 A1 | 4/2008 | |
| WO | 2009041785 A2 | 4/2009 | |
| WO | 2010112236 A1 | 10/2010 | |

OTHER PUBLICATIONS

Translation of First Office Action issued in Japanese Patent Application No. 2014-534553, dated Mar. 10, 2015, 5 pages.

Translation of Korean Office Action for Korean Application No. 2014-7011827 dated Apr. 20, 2015, 4 pages.

* cited by examiner

ACTIVATING AND DEACTIVATING SEMI-PERSISTENT SCHEDULING FOR AN LTE VOIP RADIO BEARER

CROSS-REFERENCE TO RELATED APPLICATION(S)

This application claims the benefit of U.S. Provisional Application Ser. No. 61/542,713, entitled "ACTIVATING AND DEACTIVATING SEMI-PERSISTENT SCHEDULING FOR AN LTE VOIP RADIO BEARER" and filed on Oct. 3, 2011, which is expressly incorporated by reference herein in its entirety.

BACKGROUND

1. Field

The present disclosure relates generally to communication systems, and more particularly, to activating and deactivating semi-persistent scheduling for VoIP service in LTE and High Speed Packet Access (HSPA) networks.

2. Background

Wireless communication systems are widely used to provide a variety of communication services such as voice, data, broadcast, and others. These communication systems may be multiple-access systems supporting simultaneous resource use by multiple users. This resource sharing is accomplished through the use of shared system resources, including bandwidth and transmit power. A number of multiple access systems are currently in use and include code division multiple access (CDMA), time division multiple access (TDMA), frequency division multiple access (FDMA), and orthogonal frequency division multiple access (OFDMA). These access systems may be used in conjunction with various communication standards such as those promulgated by 3GPP Long Term Evolution (3G LTE). LTE is an emerging telecommunication standard and is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), single carrier frequency division multiple access (SC-FDMA) on the uplink (UL), and multiple-input multiple-output (MIMO) antenna technology.

Wireless multiple access communication systems typically support multiple wireless terminals. Each wireless terminal, also known as a mobile device or user equipment (UE), communicates with one or more base stations using forward and reverse links. The forward link refers to communication link from the base stations to the mobile terminals or UEs, and may also be known as the downlink. The reverse link refers to the communication link from the UEs to the base stations (BS). The communication link may be established by a single link system or a MIMO system.

The traffic generated by the UEs and BSs is managed in part by a serving network controller, which serves as the arbiter of wireless traffic. The network controller can send control information to UEs, assign wireless resources to UEs, manages uplink and downlink interference, and coordinates MIMO transmissions among neighboring BSs. The serving network controller acts as a central planner for managing the disparate wireless communications and ensures consistency and reliability.

One communication standard, 3GPP defines a mechanism known as Semi-Persistent Scheduling (SPS) that eliminates the need for a Physical Downlink Control Channel (PDCCH) resource for each uplink and downlink resource grant. When there is a large number of voice over internet protocol (VoIP) users, the overhead becomes a limiting factor for efficient system operation. The 3GPP specification does not define an activation and deactivation triggering mechanism for SPS, nor does it specify the conditions of SPS activation and deactivation. There is a need in the art for a method and apparatus for determining when to activate and deactivate uplink SPS on both uplink and downlink for an LTE VoIP radio bearer based upon the state of the eNB ROHC decompressor and compressor.

SUMMARY

In an aspect of the disclosure, a method, a computer program product, and an apparatus are provided. An operational state of a header compressor or a header decompressor is determined. The operational state of the header compressor or the header decompressor may be determined by determining a transition between different operational states associated with the header compressor.

In some embodiments, the method comprises changing a persistent scheduling mode in response to a change in the operational state of the header compressor. Changing the persistent scheduling mode may comprise activating uplink persistent scheduling when the operational state of the header compressor changes from a first order state to a second order state. Changing the persistent scheduling mode may comprise deactivating the uplink persistent scheduling when the operational state of the header compressor exits the second order state.

Determining the operational state of the header compressor or the header decompressor may include determining a transition between different operational states associated with the header decompressor. Changing the persistent scheduling mode may comprise activating downlink persistent scheduling when the operational state of the header decompressor changes from a static context state to a full context state. Changing the persistent scheduling mode may comprise deactivating the downlink persistent scheduling mode when the operational state of the header decompressor enters a no context state. The persistent scheduling mode may be changed during a talk period, where the talk period corresponds to the generation of a speech frame by a codec. The persistent scheduling mode may be changed when a silence descriptor is generated by a codec.

Changing the persistent scheduling mode may comprise activating the persistent scheduling mode. Activating persistent scheduling mode may include determining a fixed set of recurring resource blocks, and determining a periodicity of the persistent scheduling mode. Changing the persistent scheduling mode may comprise deactivating the persistent scheduling mode. Deactivating persistent scheduling mode may include de-allocating the fixed set of recurring resource blocks when a packet size is larger or smaller than the fixed set of recurring resource blocks and a periodicity of the allocation changes.

The fixed set of recurring resource blocks may be modified when a packet size is larger or smaller than the fixed set of recurring resource blocks and a periodicity of the allocation changes. In some embodiments, only uplink resource blocks are de-allocated. In some embodiments, only downlink resource blocks are de-allocated.

Data generated by a codec or dual tone multi-function events may be communicated using the fixed set of recurring resource blocks. The semi-persistent scheduling may be deactivated after a conference call is established. The semi-persistent scheduling may be deactivated after a conference call is established by deactivating uplink semi-persistent scheduling when speech frames were being received before the conference call was established. The semi-persistent scheduling may be deactivated after a conference call is established includes deactivating downlink semi-persistent scheduling when speech frames were being transmitted before the conference call was established.

DETAILED DESCRIPTION

Figure 1:
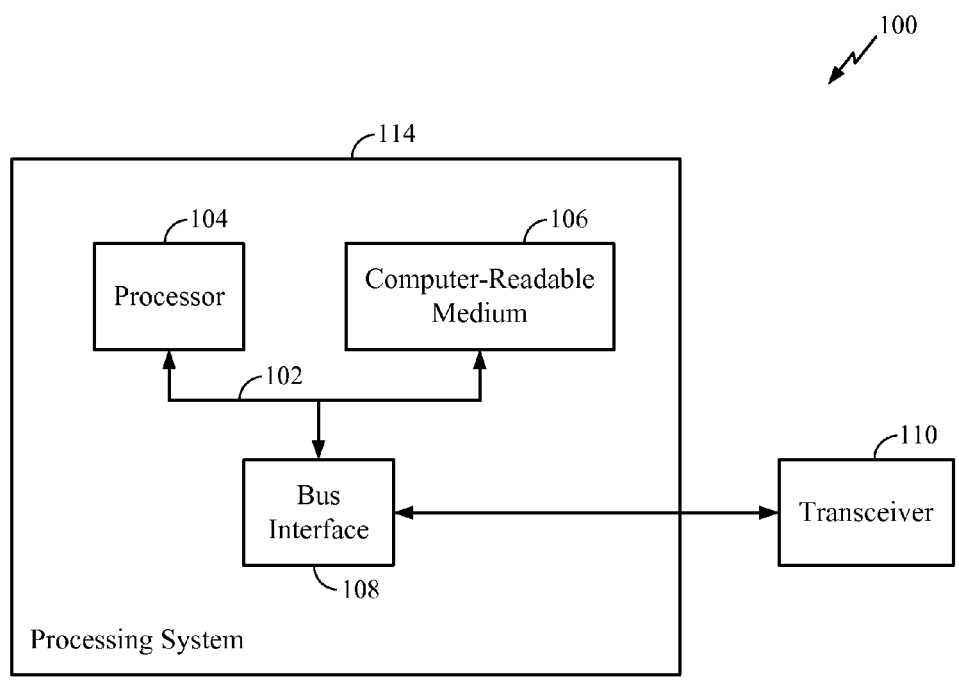
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
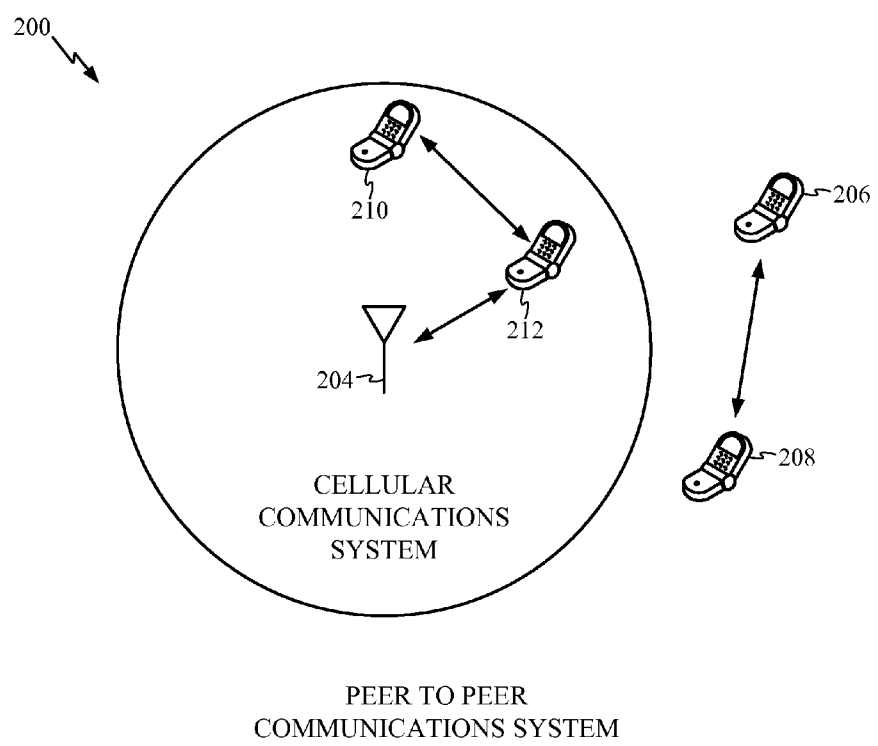
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDM) networks, Single Carrier FDMA (SC-FDMA) networks, among others. A CDMA network can implement a radio technology such as Universal Terrestrial Radio Access (UTRA), CDMA2000, and other technologies. UTRA includes Wideband CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, and others. UTRA, E-UTRA, and GSM are part of the Universal Mobile Telecommunication System (UMTS). Long Term Evolution (LTE) is a release of UMTS that uses E-UTRA. UTRA, E-UTRA, GSM, UMTS, and LTE are described in specifications issued by the "$3^{rd}$ Generation Partnership Project" (3 GPP). CDMA2000 is described in the specification promulgated by the "$3^{rd}$ Generation Partnership Project 2" (3GPP2). However, one of ordinary skill in the art would understand that the exemplary methods and apparatuses are applicable more generally to a variety of other wireless peer-to-peer communication systems.

Figure 3:
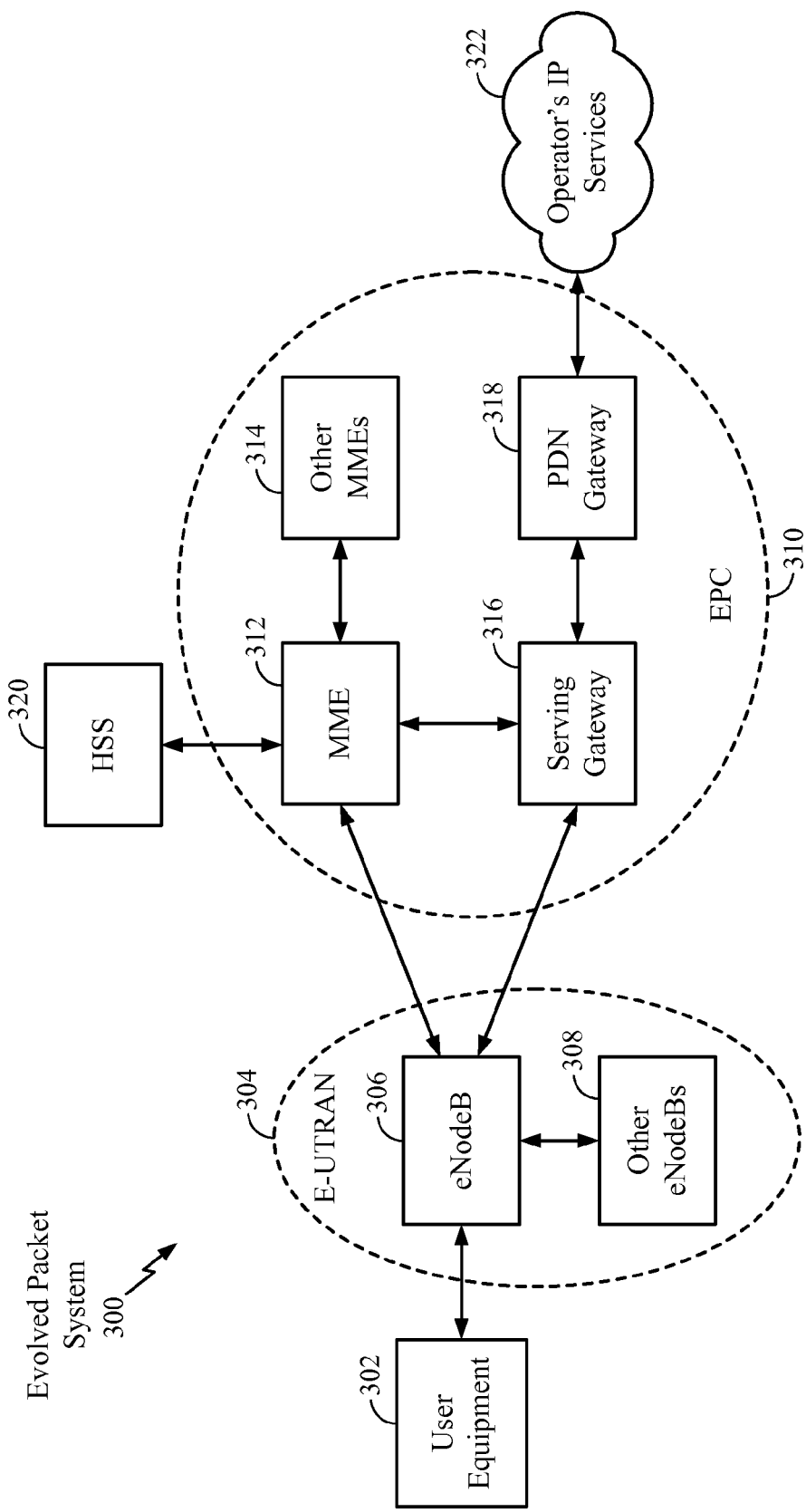
FIG. 3 is a diagram illustrating an example of a network architecture.

FIG. 3 is a diagram illustrating an LTE network architecture 300 employing various apparatuses 100 (See FIG. 1). The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 306 and other eNBs 308. The eNB 306 provides user and control plane protocol terminations toward the UE 302. The eNB 306 may be connected to the other eNBs 308 via an X2 interface (i.e., backhaul). The eNB 306 may also be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of UEs 302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 306 is connected by an S1 interface to the EPC 310. The EPC 310 includes a Mobility Management Entity (MME) 212, other MMEs 314, a Serving Gateway 316, and a Packet Data Network (PDN) Gateway 318. The MME 312 is the control node that processes the signaling between the UE 302 and the EPC 310. Generally, the MME 312 provides bearer and connection management. All user IP packets are transferred through the Serving Gateway 316, which itself is connected to the PDN Gateway 318. The PDN Gateway 318 provides UE IP address allocation as well as other functions. The PDN Gateway 318 is connected to the Operator's IP Services 322. The Operator's IP Services 322 include the Internet, an Intranet, an IP Multimedia Subsystem (IMS), and a PS Streaming Service (PSS).

Figure 4:
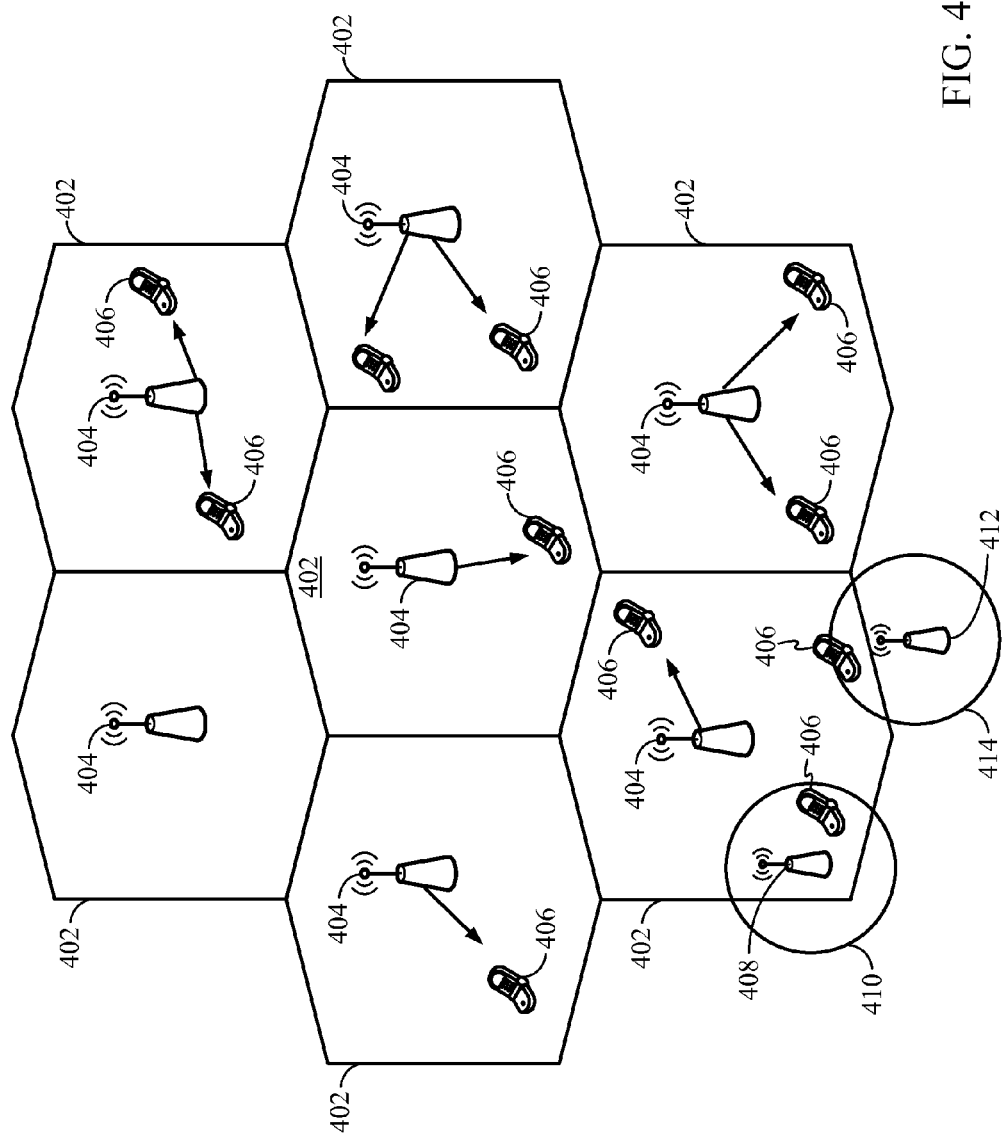
FIG. 4 is a diagram illustrating an example of an access network.

FIG. 4 is a diagram illustrating an example of an access network in an LTE network architecture. In this example, the access network 400 is divided into a number of cellular regions (cells) 402. One or more lower power class eNBs 408, 412 may have cellular regions 410, 414, respectively, that overlap with one or more of the cells 402. The lower power class eNBs 408, 412 may be femto cells (e.g., home eNBs (HeNBs)), pico cells, or micro cells. A higher power class or macro eNB 404 is assigned to a cell 402 and is configured to provide an access point to the EPC 310 for all the UEs 406 in the cell 402. There is no centralized controller in this example of an access network 400, but a centralized controller may be used in alternative configurations. The eNB 404 is responsible for all radio related functions including radio bearer control, admission control, mobility control, scheduling, security, and connectivity to the serving gateway 316 (see FIG. 3).

The modulation and multiple access scheme employed by the access network 400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 404 may have multiple antennas supporting MIMO technology. The use of MIMO technology enables the eNB 404 to exploit the spatial domain to support spatial multiplexing, beamforming, and transmit diversity.

Spatial multiplexing may be used to transmit different streams of data simultaneously on the same frequency. The data steams may be transmitted to a single UE 406 to increase the data rate or to multiple UEs 406 to increase the overall system capacity. This is achieved by spatially precoding each data stream and then transmitting each spatially precoded stream through a different transmit antenna on the downlink. The spatially precoded data streams arrive at the UE(s) 406 with different spatial signatures, which enables each of the UE(s) 406 to recover the one or more data streams destined for that UE 406. On the uplink, each UE 406 transmits a spatially precoded data stream, which enables the eNB 404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 5:
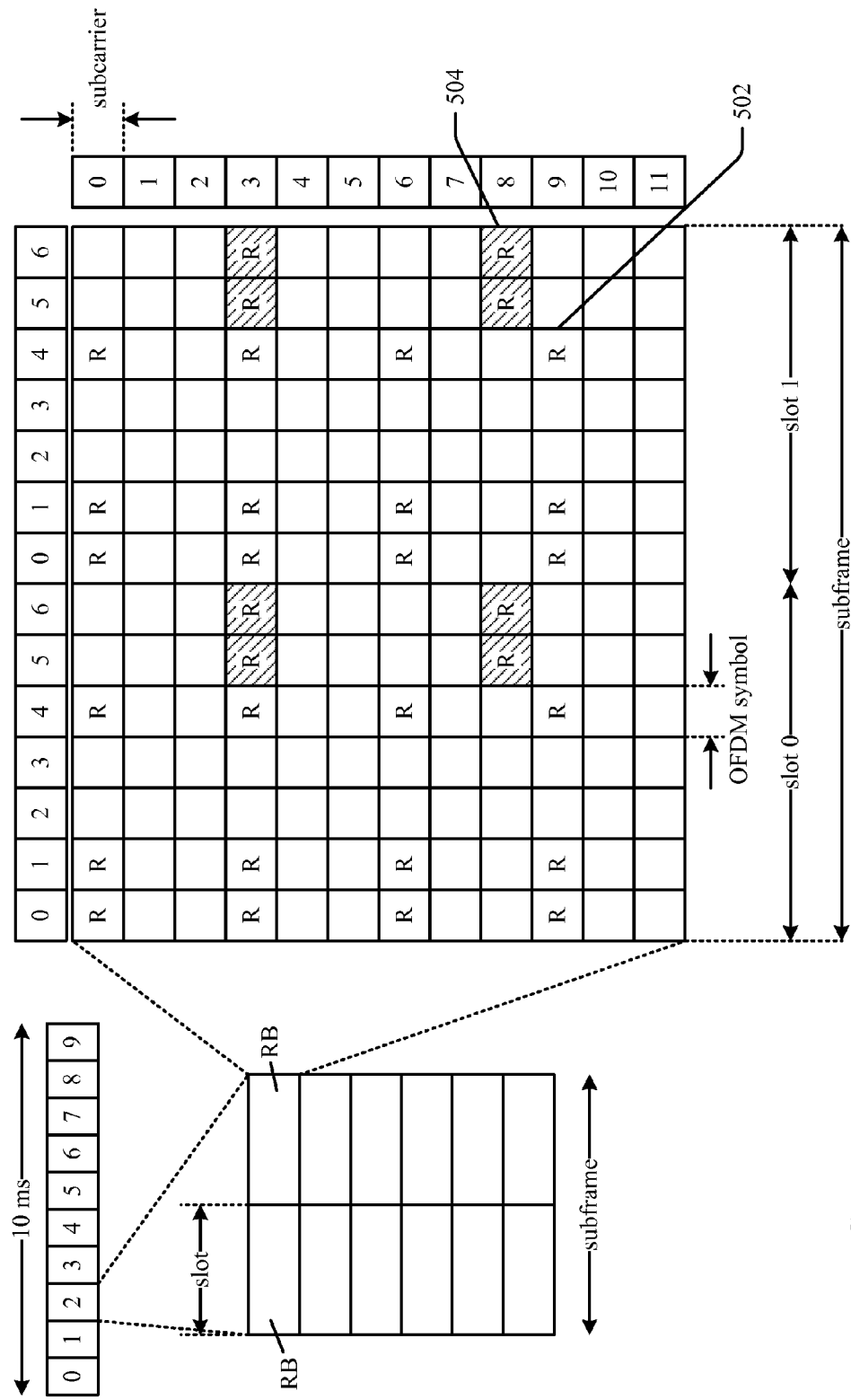
FIG. 5 is a diagram illustrating an example of a frame structure for use in an access network.

Various frame structures may be used to support the DL and UL transmissions. An example of a DL frame structure will now be presented with reference to FIG. 5. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 502, 504, include DL reference signals (DL-RS). The DL-RS include Cell-specific RS (CRS) (also sometimes called common RS) 502 and UE-specific RS (UE-RS) 504. UE-RS 504 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 6:
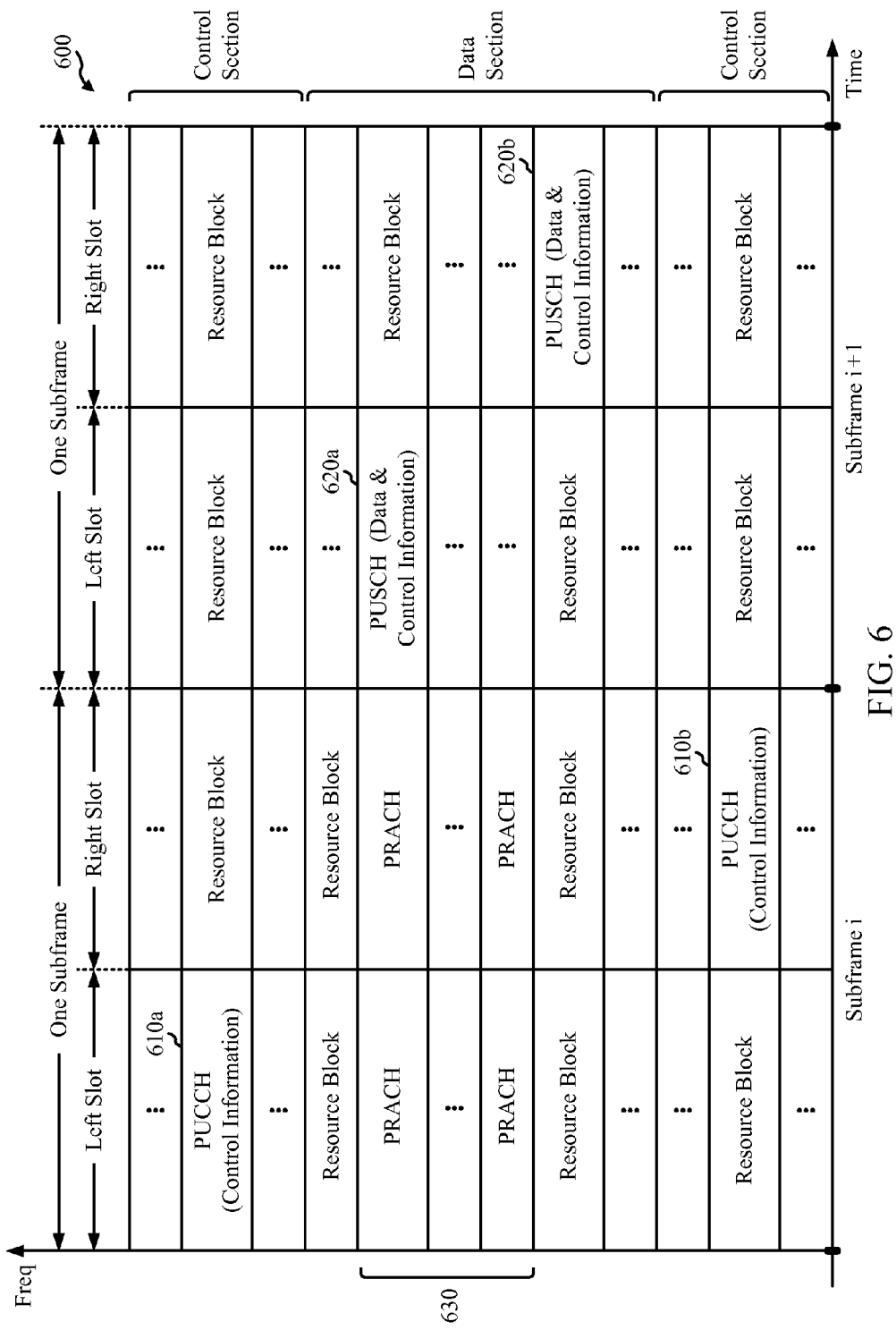
FIG. 6 shows an exemplary format for the UL in LTE.

An example of a UL frame structure 600 will now be presented with reference to FIG. 6. FIG. 6 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 6 results in the data section including contiguous subcarriers, which may allow a single UE to be assigned all of the contiguous subcarriers in the data section.

A UE may be assigned resource blocks 610a, 610b in the control section to transmit control information to an eNB. The UE may also be assigned resource blocks 620a, 620b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 6.

As shown in FIG. 6, a set of resource blocks may be used to perform initial system access and achieve UL synchronization in a physical random access channel (PRACH) 630. The PRACH 630 carries a random sequence and cannot carry any UL signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 7:
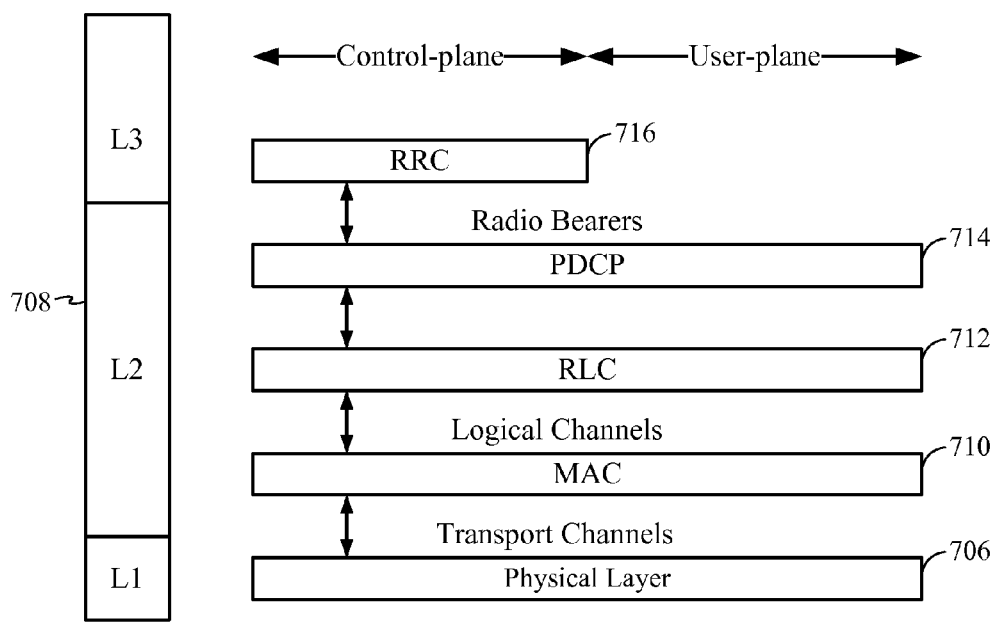
FIG. 7 is a diagram for illustrating an example of a radio protocol architecture for the user and control plane.

The radio protocol architecture may take on various forms depending on the particular application. An example for an LTE system will now be presented with respect to FIG. 7. FIG. 7 is a conceptual diagram illustrating an example of the radio protocol architecture for the user and control planes.

Turning to FIG. 7, the radio protocol architecture to the UE and the eNB is shown with three layers: Layer 1, Layer 2, and Layer 3. Layer 1 is the lowest layer and implements various physical layer signal processing functions. Layer 1 will be referred to herein as the physical layer 706. Layer 2 (L2 layer) 708 is above the physical layer 706 and is responsible for the link between the UE and eNB over the physical layer 706.

In the user plane, the L2 layer includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g. IP layer) that is terminated at the PDN gateway 308, (see FIG. 3) on the network side, and an application layer that is terminated at the other end of the connection (e.g., far end UE, server, etc.).

The PDCP layer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
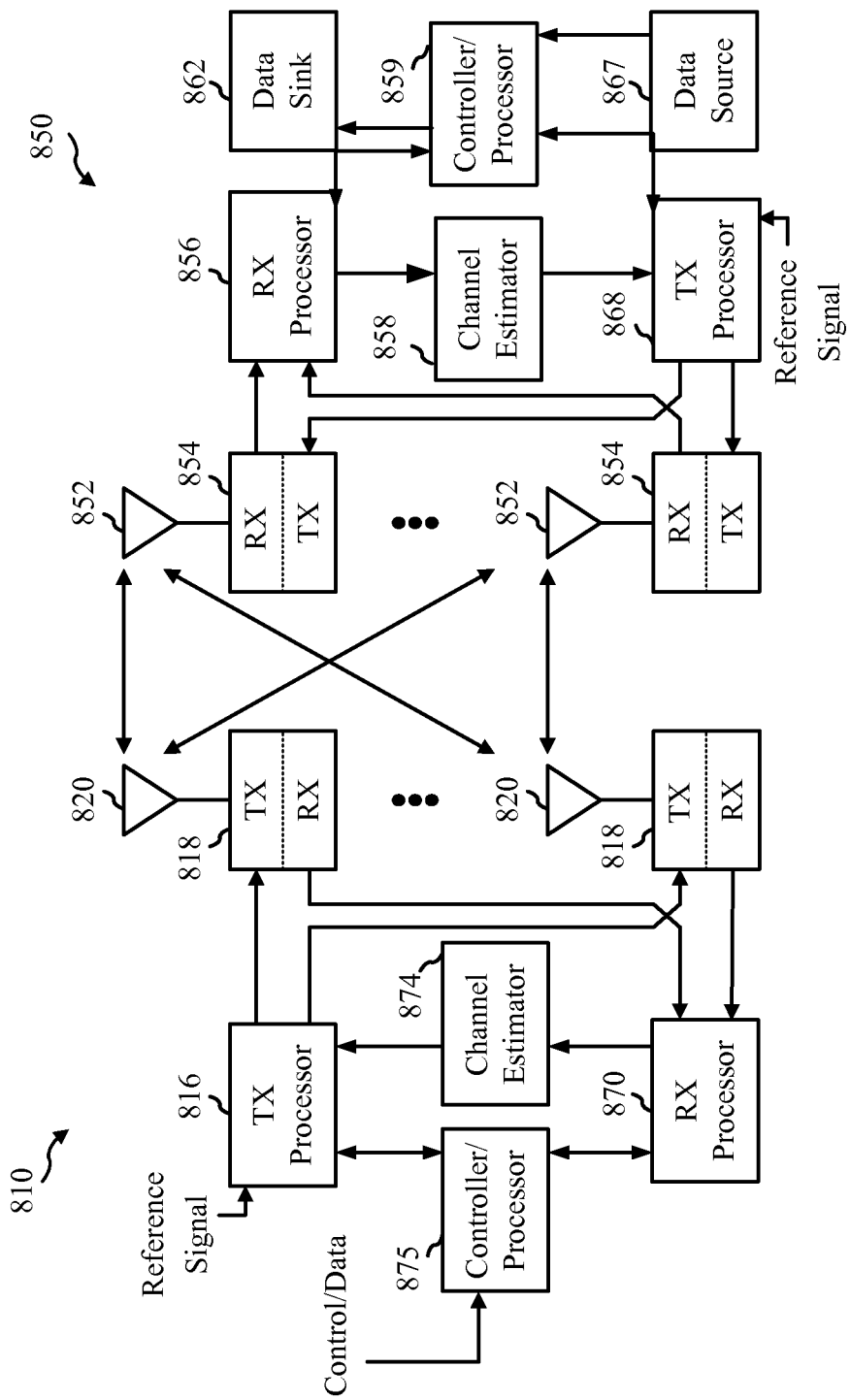
FIG. 8 is a diagram illustrating an example of an evolved Node B and user equipment in an access network.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE. FIG. 8 is a block diagram of an eNB 810 in communication with a UE 850 in an access network. In the DL, upper layer packets from the core network are provided to a controller/processor 875. The controller/processor 875 implements the functionality of the L2 layer described earlier in connection with FIG. 7. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The TX process 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 818TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receiver (RX) processor 856.

The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal has a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer described earlier in connection with FIG. 7. In the UL, the controller/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer (L2). Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 implements the L1 layer.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the UE 850. Upper layer packets from the controller/processor 875 may be provided to the core network. The controller/processor 859 is also responsible for error detection using an ACK and/or NACK protocol to support HARQ operations.

The processing system 104 described in relation to FIG. 1 may comprise eNB 810. In particular, the processing system 104 may include the TX processor 816, the RX processor 870, and the controller 875.

Certain embodiments of the present invention provide methods and apparatus for activating and deactivating uplink and downlink SPS for an LTE VoIP service. Certain embodiments integrate eNB RObust Header Compression (ROHC) functionality with an eNB MAC scheduler using a ROHC Interface Module (RIM). The UE ROHC functionality is typically not affected. Uplink SPS operation may be activated when the ROHC compressor in the eNB operating in a first order (FO) state enters a second order (SO) state. Downlink SPS operation may be activated during a "talk period" as a function of the eNB compressor. The eNB ROHC decompressor and compressor may be operated such that they adopt states selected to produce maximum header compression, which results in the smallest packet size possible. Otherwise, both downlink and uplink SPS functionality may be deactivated. This approach does not substantially affect ROHC functionality. The uplink and downlink SPS may also be activated during a "silence period" 904 as a function of the state of the eNB ROHC decompressor and compressor. In some embodiments activation during the silence period may not be as efficient as other activation methods disclosed herein.

An LTE system, including the example described herein, is a packet-switched system. As a result, a voice service using an LTE network may also comprise a packet switched service such as an Internet Protocol (IP) based, as opposed to a circuit switched service, such as Global System for Mobile (GSM) or Universal Mobile Telephone System (UMTS). Voice service may be provided in an LTE network using Voice over IP (VoIP) in conjunction with IP Multimedia System (IMS) or other voice service, such as Skype. VoIP service in an LTE network may require the use of ROHC and SPS in order to provide a high capacity voice service with a high quality of service (QoS).

In certain embodiments, ROHC compresses the size of the RTP/UDP/IP header (IPv4 or IPv6) down to a minimum of 3 bytes. This may be of particular importance when the service is used by a large number of LTE VoIP users and when capacity is limited by a number of available control channels. SPS may eliminate the need for a physical downlink control channel (PDCCH) resource for each uplink and downlink resource grant, thereby providing an important advantage, because the overhead required to support each downlink and uplink resource grant becomes a constraining factor when many users desire the VoIP service. SPS allows an eNB to allocate UE resources for a period of time. These resources can be allocated on a control channel.

In certain embodiments, when the eNB ROHC modules makes a decision to request activation or deactivation of either the uplink or the downlink SPS for an LTE VoIP radio bearer, the request is transmitted to the eNB MAC scheduler using a ROHC Interface Module (RIM). In response, the eNB MAC scheduler may activate or deactivate SPS.

Figure 9:
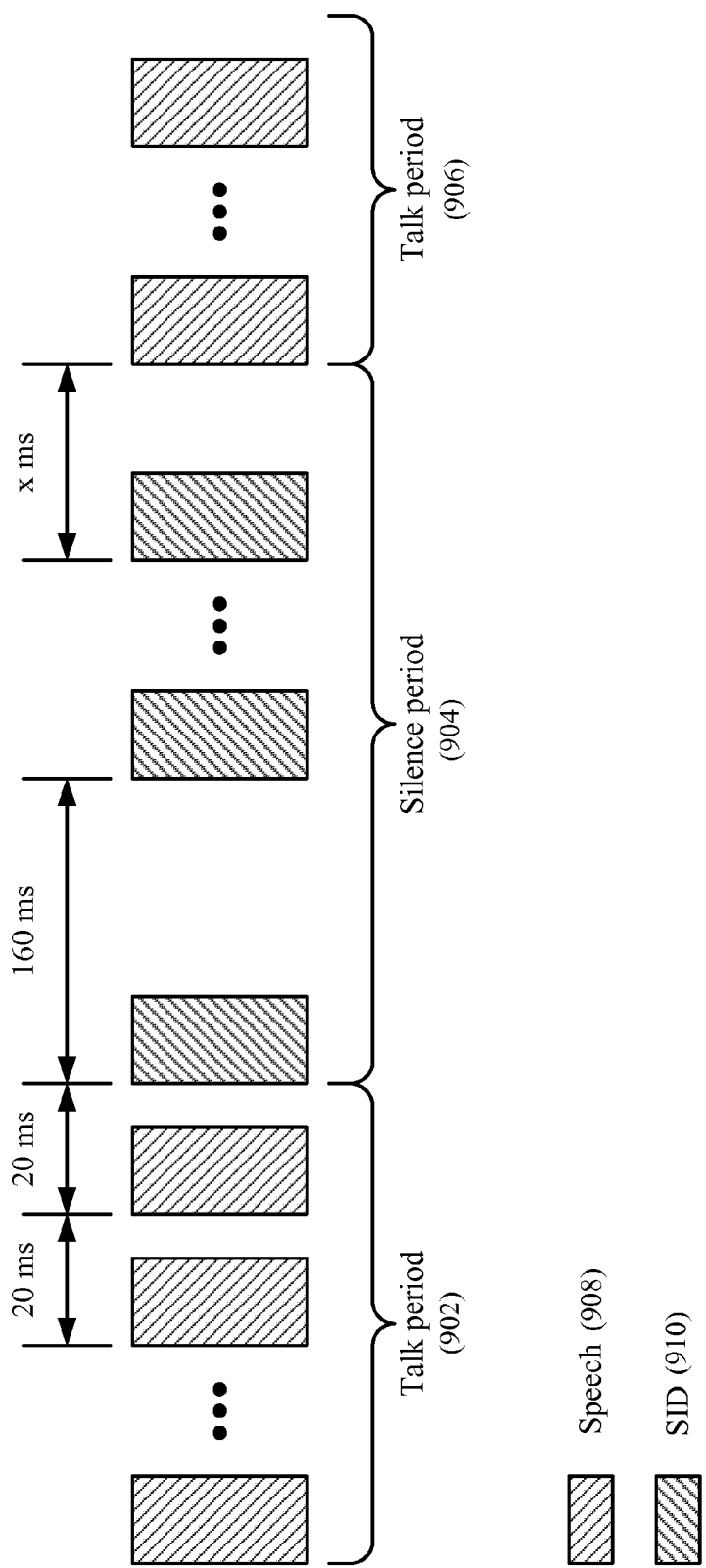
FIG. 9 is an illustration of the characteristics of voice service using an AMR speech codec.

An adaptive multi-rate (AMR) speech codec may be based on an algebraic code excited linear prediction (ACELP) algorithm, and may comprise a multi-rate speech codec, a source controller rate (SCR) scheme that includes a voice activity generator (VAD), a comfort noise generation system, and an error concealment mechanism to combat the effects of transmission errors and lost frames. FIG. 9 depicts certain characteristics of a voice service using an AMR speech codec, in which the AMR speech codec generates a speech frame 908 every 20 milliseconds during a "talk period" 902 and a Silence Descriptor (SID) frame 910 every 160 milliseconds during a "silence period" 904.

For real-time applications, such as VoIP, the overhead due to RTP, UDP and IP headers is 40 bytes in IPv4 and 60 bytes in IPv6. The size of the bandwidth efficient AMR speech codec payload for 12.2 kbps is 32 bytes, while for SID 910 it is 7 bytes. The 12.2 kbps AMR speech codec payload corresponds to approximately 125% header overhead for IPv4 and 187% for IPv6. This SID 910 payload corresponds to approximately 571% header overhead for IPv4 and 857% header overhead for IPv6. This large overhead is excessive for LTE VoIP and can lead to severe degradation in spectrum efficiency. Accordingly, certain embodiments employ header compression.

ROHC describes a set of header compression mechanisms for compressing IP-based protocol headers. The ROHC framework specifies the common features of the compressor and decompressor such as mode, state, and packet type. The specific states may include: compressor state, decompressor state, mode, and packet type.

In the compressor state, the initialization and refresh (IR) state, First Order (FO) state, and Second Order (SO) state are specified.

In the decompressor state the No Context (NC) state, Static Context (SC) state, and Full Context (FC) state are specified.

In the mode state the Unidirectional mode (U-mode), Bi-directional Optimistic mode (O-mode), and Bi-directional Reliable mode (R-mode) are specified. In the O-mode and IR-mode, the decompressor sends NACKs when it is unable to decompress a packet. In the R-mode, the decompressor sends ACKs when it successfully decompresses a packet.

The compressor Packet type may handle by sending out different types of packets according to the state of the compressor. In IR-mode, the compressor sends out an IR packet, which contains the fields of the headers in uncompressed format and can be decompressed independently. In response, the decompressor may send a feedback packet which may include both an acknowledgement (ACK) and a request to transition to another mode, such as from U-mode to O-mode. This transition may depend upon the state of the decompressor. In FO state, the IR-DYN packet, which contains only the dynamic part of the context, is sent. In the SO state, packets with fully compressed headers are sent.

Figure 10:
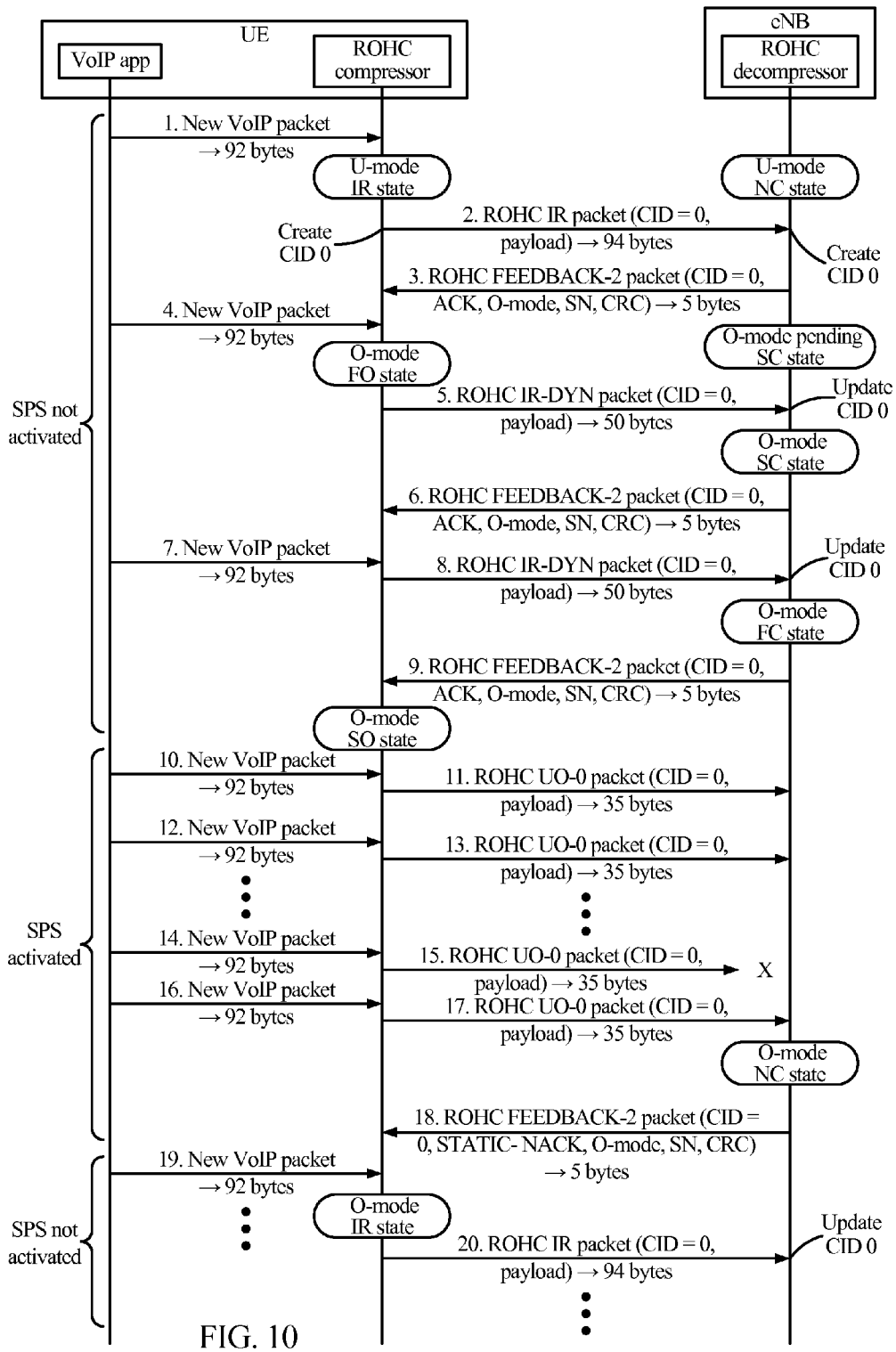
FIG. 10 illustrates the process of ROHC O-mode applied to LTE VoIP on the uplink during AMR speech codec "talk period" according to an embodiment.

FIG. 10 illustrates an example of O-mode operation applied to LTE VoIP on the uplink during an AMR speech codec "talk period" 902. Downlink acquisition may operate in a similar manner, except that certain directions (indicated by arrows) may be reversed and the compressor may be embodied in an eNB, while the decompressor may be embodied in user equipment (UE). In FIG. 10 an AMR speech codec is configured for bandwidth efficient operation at 12.2 kbps with the RTP payload comprising a single speech frame 908. For clarity and simplicity, PDCCH uplink and downlink grants and SPS activation and deactivation are not shown. In addition, uplink and downlink PUCCH, PHICH HARQ ACKs and NACKs are not shown. FIG. 10 does not account for the overhead due to PDCP, RLC, and MAC layers.

In FIG. 10, step 1 the compressor mode is initialized to U-mode and IR state. The decompressor mode is initialized to U-mode and NC state. The IR state of the compressor is used to initialize the decompressor with the static and dynamic context. In order to accomplish this, the compressor transmits an IR packet to the decompressor in Step 2. Once the IR packet is successfully received the decompressor transmits an ACK and then transitions to the SC state.

The compressor may remain in U-mode and IR state until it receives feedback from the decompressor. This feedback is an ACK that indicates that the IR packet was correctly decompressed. The feedback also contains a request for the compressor to transition to Q-mode in step 3.

In step 3, the compressor transitions to O-mode and FO state and begins to transmit initialization and refresh dynamic (IR-DYN) packets to the decompressor. This is typically accomplished in step 4. The decompressor communicates only the changes to the dynamic part of the contexts, as seen in steps 5 and 8 of FIG. 10. In step 6 ROHC feedback is sent and in step 7 a new VoIP packet is sent. The decompressor may acknowledge both IR-DYN packets and then transitions to the FC state. The compressor remains in the FO state until the compressor is confident that the decompressor knows the dynamic context. When the compressor enters the SO state it may begin transmitting the UO-0 packets to the decompressor. The UO-0 packets may consume fully compressed headers (as illustrated in steps 9-14). At this point, the eNB may activate SPS in order to avoid control channel limitations.

In step 15 of FIG. 10, the decompressor fails to successfully decode the UO-0 packet that was transmitted by the compressor. In step 16 a new VoIP packet is sent. In step 17, the decompressor successfully decodes the next UO-0 packet send by the compressor. This causes the decompressor to lose both static and dynamic context and enter the NC state. Once in the NC state, the decompressor transmits a STATIC-NACK to the compressor, as seen in steps 18 and 19. At this point in time the eNB deactivates the SPS. After receiving the STATIC-NAK from the decompressor, the compressor transitions to the IR state and transmits an IR packet to the decompressor in step 20. At this point, the entire call flow repeats until the compressor once again enters the SO state.

Dynamic scheduling may be specified as the default uplink and downlink scheduling mechanism for LTE. With dynamic scheduling, the eNB scheduler can have maximum flexibility to schedule uplink and downlink HARQ transmissions and retransmissions for multiple UEs using link adaptation. In order to optimize link adaptation, the eNB: (1) measures the UE SRS for use in uplink scheduling algorithms and (2) receives and processes the CQI reports from the UE for use in the downlink scheduling algorithms.

A drawback to using dynamic scheduling is that the PDCCH resources are consumed for each uplink and downlink resource grant and as a result, some form of PDCCH resource management is required in the eNB scheduler to ensure that all UEs may be properly scheduled in accordance with their specific Quality of Service (QoS) requirements.

In LTE the speech frames 908 typically have a constant periodicity during a "talk period" 902 and also have a small fixed packet size. When there is a large number of LTE VoIP users, the number of PDCCH resources required for dynamic scheduling can pose problems. SPS is the mechanism used to address this problem.

For LTE VoIP service, SPS requires the assignment of a fixed set of recurring resource blocks for the initial HARQ transmission of each speech frame 908 during a "talk period." Dynamic scheduling may be used for HARQ retransmissions of speech frames 908. During a "silence period" 904 dynamic scheduling may be used for both the initial HARQ transmission and retransmissions of SID frames 910.

In both uplink and downlink SPS activation, only the initial HARQ transmission of the first speech frame 908 during a "talk period" 902 requires a PDCCH resource in order to allocate a fixed set of recurring resource blocks (one PDCCH resource is required for the uplink resource grant and one PDCCH resource is required per downlink HARQ process that is configured for downlink SPS is required for the downlink resource grant).

Both uplink and downlink SPS deactivation may require one PDCCH resource for uplink deactivation and one PDCCH resource for downlink deactivation SPS may be required for downlink SPS deactivation.

Periodicity may be configured using upper layer signaling, such as the Radio Resource Control (RRC) protocol.

In an embodiment of the invention, both uplink and downlink SPS are activated during a "talk period" 902 once the eNB ROHC decompressor has entered the FC state and the eNB ROHC compressor has entered the SO state, or in other words, when the maximum header compression has been achieved, resulting in the smallest possible packet size.

Figure 11:
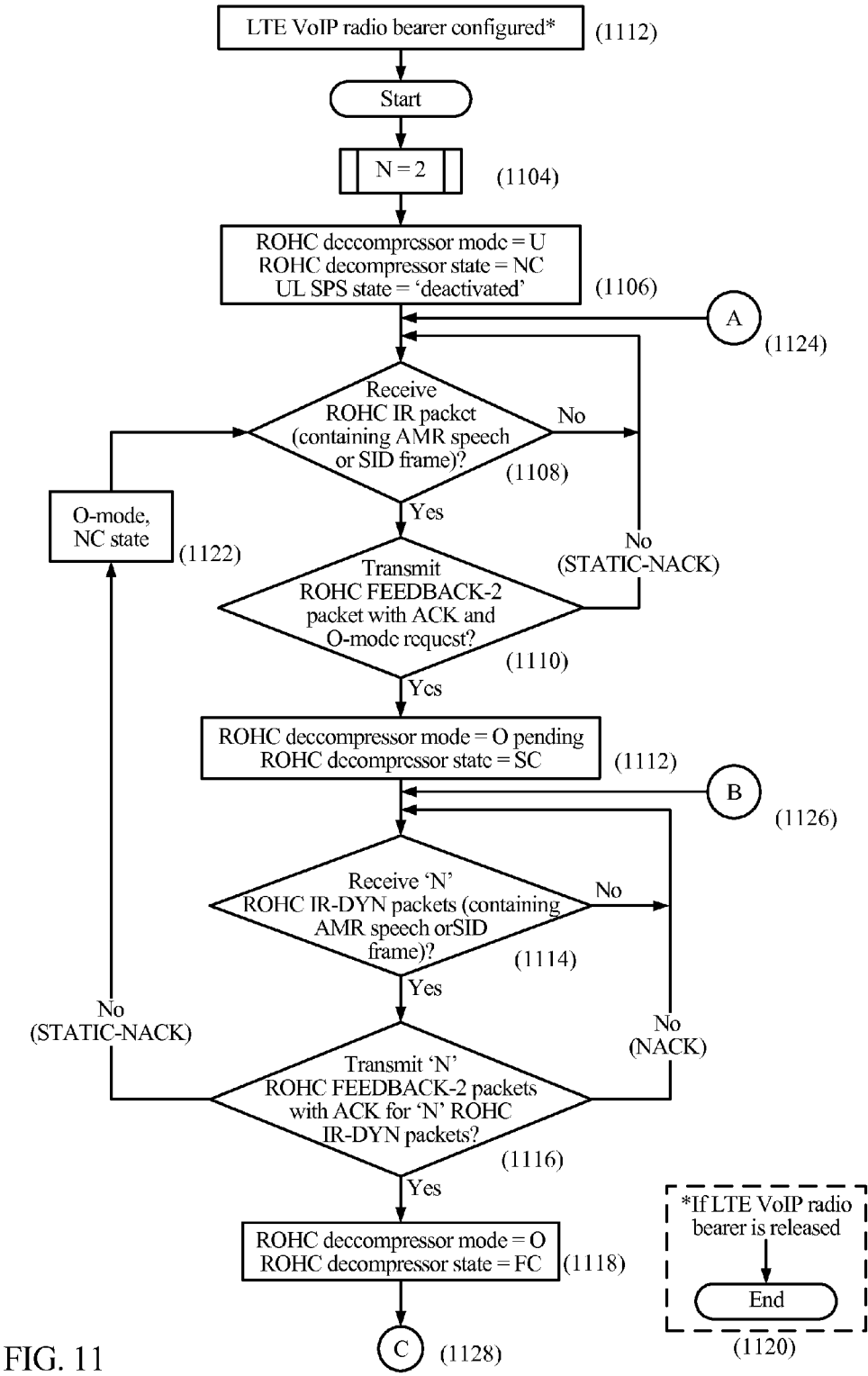
FIG. 11 is a flow chart of a method for an uplink SPS activation algorithm for LTE VoIP.
Figure 12:
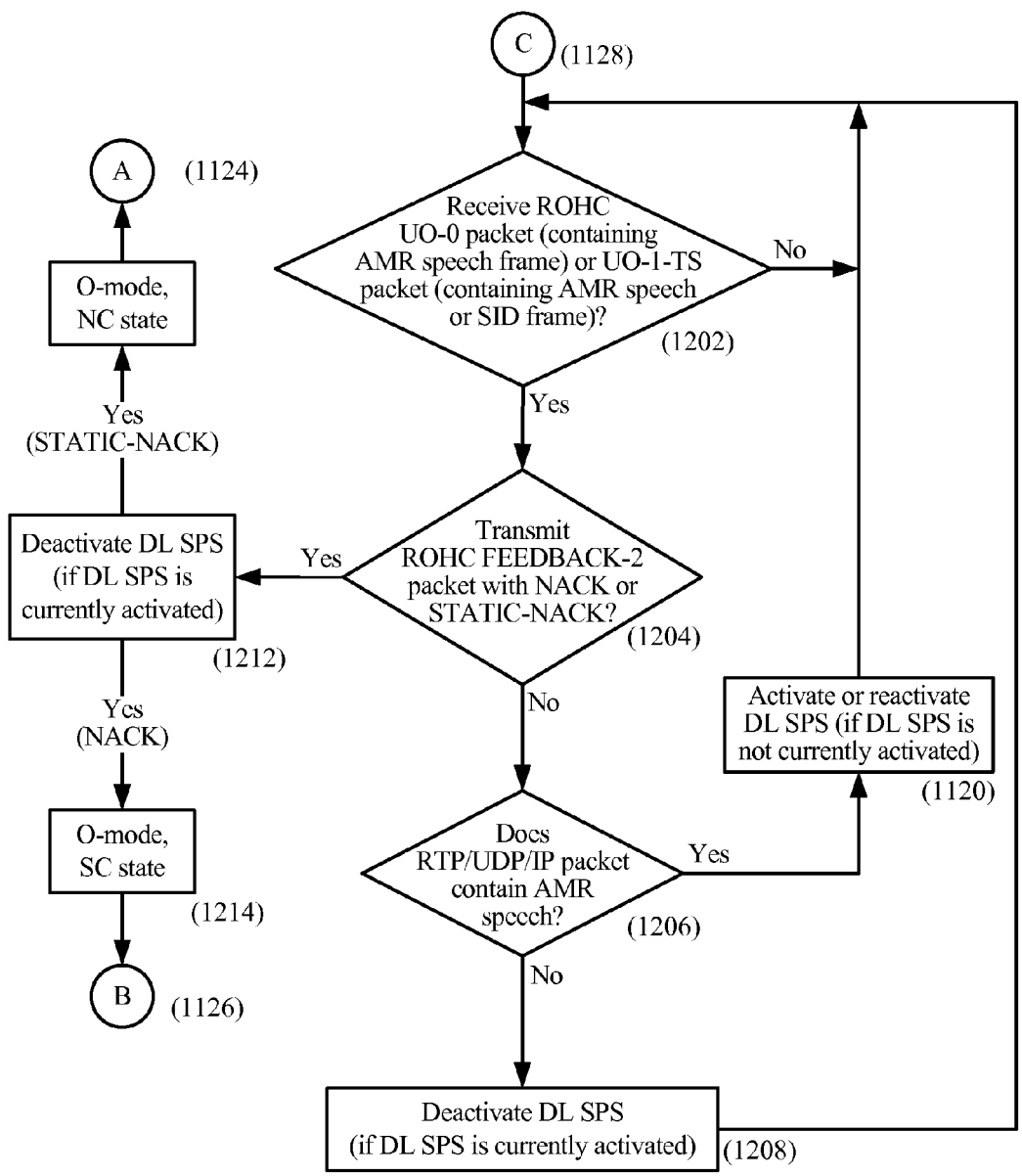
FIG. 12 is a flowchart of a further method for an uplink SPS activation algorithm for LTE VoIP.

FIGS. 11 and 12 illustrate the process flow of an embodiment of uplink SPS activation algorithm for LTE VoIP. The decompressor in the eNB is initialized to U-mode and NC state. The uplink SPS state is initialized to "deactivated."

The decompressor listens to the socket for the LTE VoIP radio bearer RLC-UM Service Access Point (SAP). If the decompressor receives an IR packet during the listening phase that contains either an AMR speech frame 908 or an SID frame 910, the decompressor may respond by sending a FEEDBACK-2 packet containing an ACK and a request to transition to O-mode if the IR packet is successfully decoded. This may cause the decompressor to transition to O-mode pending and SC state. However, if the IR packet is not successfully decoded, the compressor may transmit a FEEDBACK-2 packet containing a STATIC-NAK and remains in U-mode and NC state.

When the decompressor enters the O-mode pending and SC state, it typically listens to the socket for "N" incoming IR-DYN packets containing either an AMR speech frame 908 or SID frame 910. When the decompressor successfully decodes "N" IR-DYN packets and is confident that it knows the dynamic context, it may transmit "N" FEEDBACK-2 packets containing ACKs for the "N" successfully decoded IR-DYN packets as they arrive and transitions to O-mode and FC state.

At this point, the decompressor listens to the socket for UO-0 packets that contain AMR speech frames 908 or UO-1-TS packets that contain either an AMR speech frame 908 or SID frame 910. The decompressor may receive a UO-1-TS packet containing an AMR speech frame 908 because, if this is the first AMR speech frame 908 in a "talk period" 902 then the compressor, which is in SO state, must typically transmit a UO__1-TS packet. In this scenario, the AMR speech codec sets the marker bit M=1 for the first speech frame 908 in a "talk period" 902 and the UO-1-TS packet includes the marker bit for the M field while the UO-0 packet does not. The decompressor may receive a UO-1-TS packet containing a SID frame 910 because the periodicity of the SID frames 910 is 160 milliseconds, instead of 20 milliseconds and the UO-1-TS packet updates the RTP timestamp context while the UO-0 packet does not.

While the decompressor is in O-mode and FC state, it may only send feedback in the form of a NACK or STATIC-NAK when it fails to decode a UO-0 or UO-1-TS packet. Typically, ACKs are not transmitted. If ACKs are transmitted, the decompressor may send a primitive to the MAC sublayer in order to deactivate uplink SPS, if the uplink SPS is currently activated.

If the decompressor receives and successfully decodes a UO-0 or UO-1-TS packet containing an AMR speech frame 908, the decompressor may send a primitive to the MAC sublayer, in order to activate or reactivate uplink SPS, if the uplink SPS is not currently activated. If the decompressor receives and successfully decodes a UO-1-TS packet containing a SID frame 910, it may send a primitive to the MAC sublayer to deactivate the uplink SPS, if the uplink SPS is currently activated.

The decompressor can determine whether or not the UO-1-TS packet contains an AMR speech frame 908 or SID frame 910 by examining the packet length of the received PDCP PDU. It should be noted that the packet length must typically be inferred because the Payload Length field in the IPv6 header which conveys the length of the data carried after the IPv6 header is not contained in either the static or dynamic ROHC context.

Referring to FIGS. 11 and 12, when the decompressor is in O-mode and FC state and receives either a UO-0 or UO-1-TS packet containing an AMR speech frame 908, the uplink SPS may be in a "deactivated" state when the AMR speech codec in the UE is in a "talk period" 902 and the decompressor in the eNB has just finished transmitting "N" FEEDBACK-2 packets containing ACKs for "N" successfully decoded IR-DYN packets. At this point, the compressor in the UE has just transitioned from a "silence period" 904 to a "talk period" 902 and the compressor in the UE is currently in the O-mode and SO state. The uplink SPS may also be in a "deactivated" state when the AMR speech codec in the UE has just transitioned from a "silence period" 904 to a "talk period" 902 and the compressor in the UE is currently in O-mode and SO state.

In both of the above scenarios, the UE needs to transmit a Buffer Status Report (BSR) to the eNB in order to receive an uplink resource grant. As a result, the first UO-0 or UO-1-TS packet containing an AMR speech frame 908 during a "talk period" 902 may need to be dynamically scheduled, which requires a PDCCH resource.

In certain embodiments, it may be possible to reserve a specific SPS logical channel group (e.g., 0) such that only the UE's LTE VoIP radio bearer is mapped to the reserved SPS logical channel group for BSR reporting, depending on the eNB MAC scheduler implementation. This leaves three remaining logical channel groups to which all of the UE's remaining Signaling Radio Bearers (SRB) and Data Radio Bearers (DRB) can be mapped. Upon receiving a short BSR and a truncated BSR MAC control element from the UE (that is a BSR comprising only one LCG ID field and one corresponding buffer size field), a smart eNB MAC scheduler can determine that the compressor was in the SO state based upon the buffer size field in the BSR. This may be done before dynamically scheduling the UO-0 or UO-1-TS packet based upon the value of the buffer size field in the BSR. The eNB MAC scheduler may then activate SPS using a PDCCH resource. Subsequently, the eNB MAC scheduler may then send a primitive to the decompressor to notify the decompressor that the uplink SPS state has been activated.

A similar situation arises during downlink SPS operation when the ROHC decompressor in the UE, which is in the FC state, needs to send a FEEDBACK-2 packet containing a NACK or STATIC NACK. In order to do this, the UE first needs to transmit a BSR to the eNB to receive an uplink resource grant even though the uplink SPS may be in an activated state. This must typically be done because the size of the fixed resource used during uplink SPS operation which carries the AMR speech frame 908 cannot accommodate both the AMR speech frame 908 and the FEEDBACK-2 packet.

Figure 13:
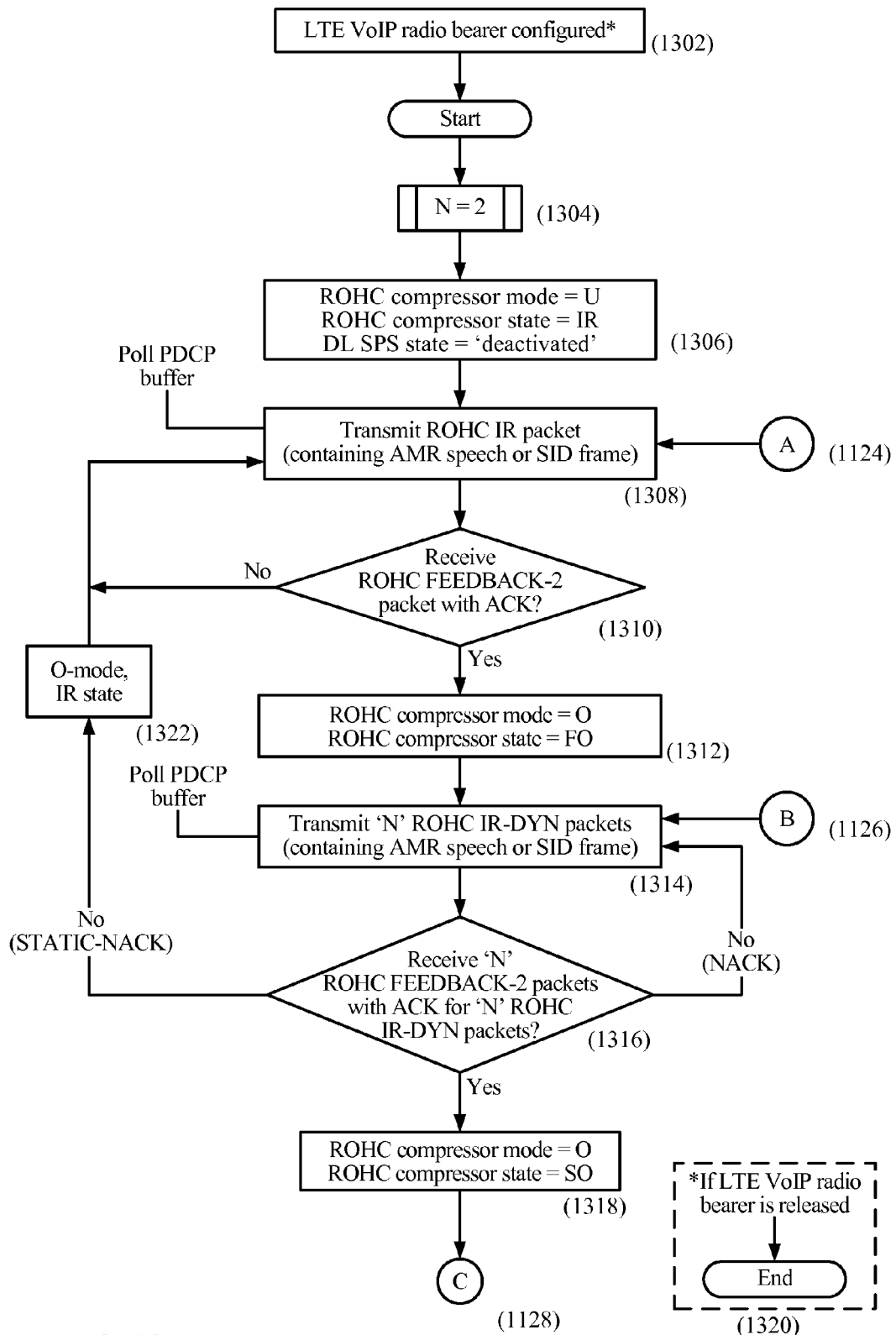
FIG. 13 is a flowchart of a method for a downlink SPS activation algorithm for LTE VoIP.
Figure 14:
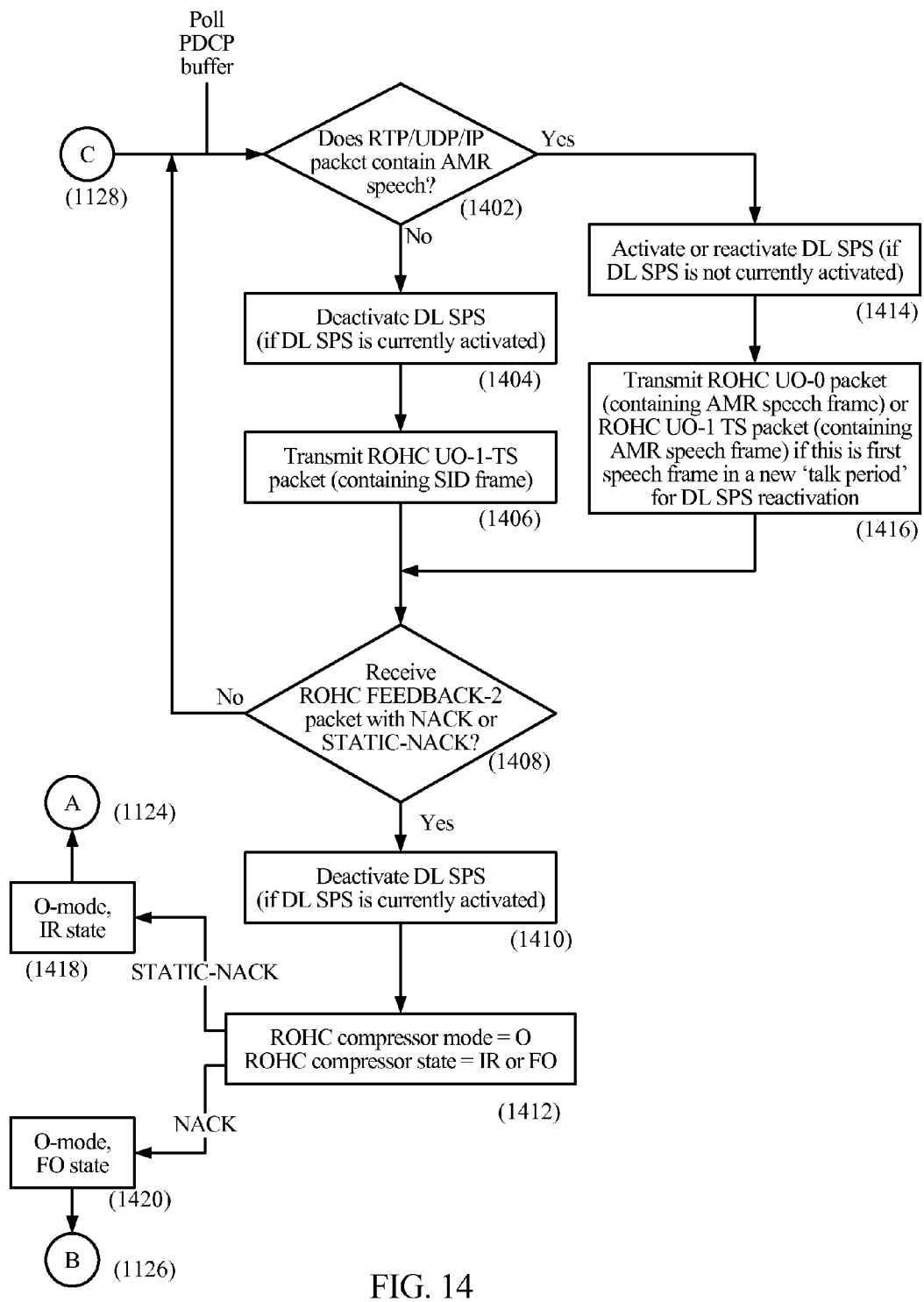
FIG. 14 is a flowchart of a further method for a downlink SPS activation algorithm for LTE VoIP.

FIGS. 13 and 14 illustrate the downlink SPS activation process for LTE VoIP. In the process, the compressor in the eNB is initialized to the U-mode and IR state and the downlink SPS state is initialized to "deactivated." The PDCP buffer is first polled and then the compressor transmits an IR packet containing either an AMR speech frame 908 or SID frame 910. If the decompressor does not successfully decode the IR packet, it may respond with a FEEDBACK-2 packet containing a STATIC-NACK and the compressor sends a second IR packet containing either the AMR speech frame 908 or the SID frame 910. This process may continue until the decompressor successfully decodes the IR packet and responds with a FEEDBACK-2 packet containing an ACK and a request to transition to the O-mode.

Once the compressor transitions to the O-mode and FO state, it may transmit "N" IR-DYN packets. The compressor may remain in the FO state until the transmitter is confident that the decompressor knows the dynamic context. In one example, the compressor may receive two FEEDBACK-2 packets containing ACKs after the decompressor successfully decodes both of the transmitted IR-DYN packets. At this point in the process, the compressor may transition to the SO state.

If the next packet requiring transmission is an AMR speech frame 908, then the compressor may send a primitive to the MAC sublayer in order to activate or reactivate the downlink SPS, if the downlink SPS is not currently active. If this is not the first AMR speech frame 908 in a "talk period" 902, the compressor may transmit a UO-0 packet. If this is the first AMR speech frame 908 in a "talk period" 902 the compressor typically must first transmit a UO-1-TS packet.

If the next packet to be transmitted is a SID frame 910, then the compressor may send a primitive to the MAC sublayer in order to deactivate the downlink SPS, if the downlink SPS is currently activated. The compressor may then transmit a UO-1-TS packet which updates the RTP timestamp context, because the periodicity of the SID frames 910 is 160 milliseconds instead of 20 milliseconds.

The compressor can determine whether not the packet in the PDCP buffer is an AMR speech frame 908 or SID frame 910 by examining the Payload Length Field in the IPv6 header. This field conveys the length of the data carried after the IPv6 header.

When the compressor is in the O-mode and SO state, the decompressor sends feedback only in the form of a NACK or STATIC NACK. ACK messages are not typically transmitted. If the compressor receives a FEEDBACK-2 packet that contains either a NACK or a STATIC NACK, the compressor sends a primitive to the MAC sublayer to deactivate the downlink SPS if the downlink SPS is currently activated.

Figure 15:
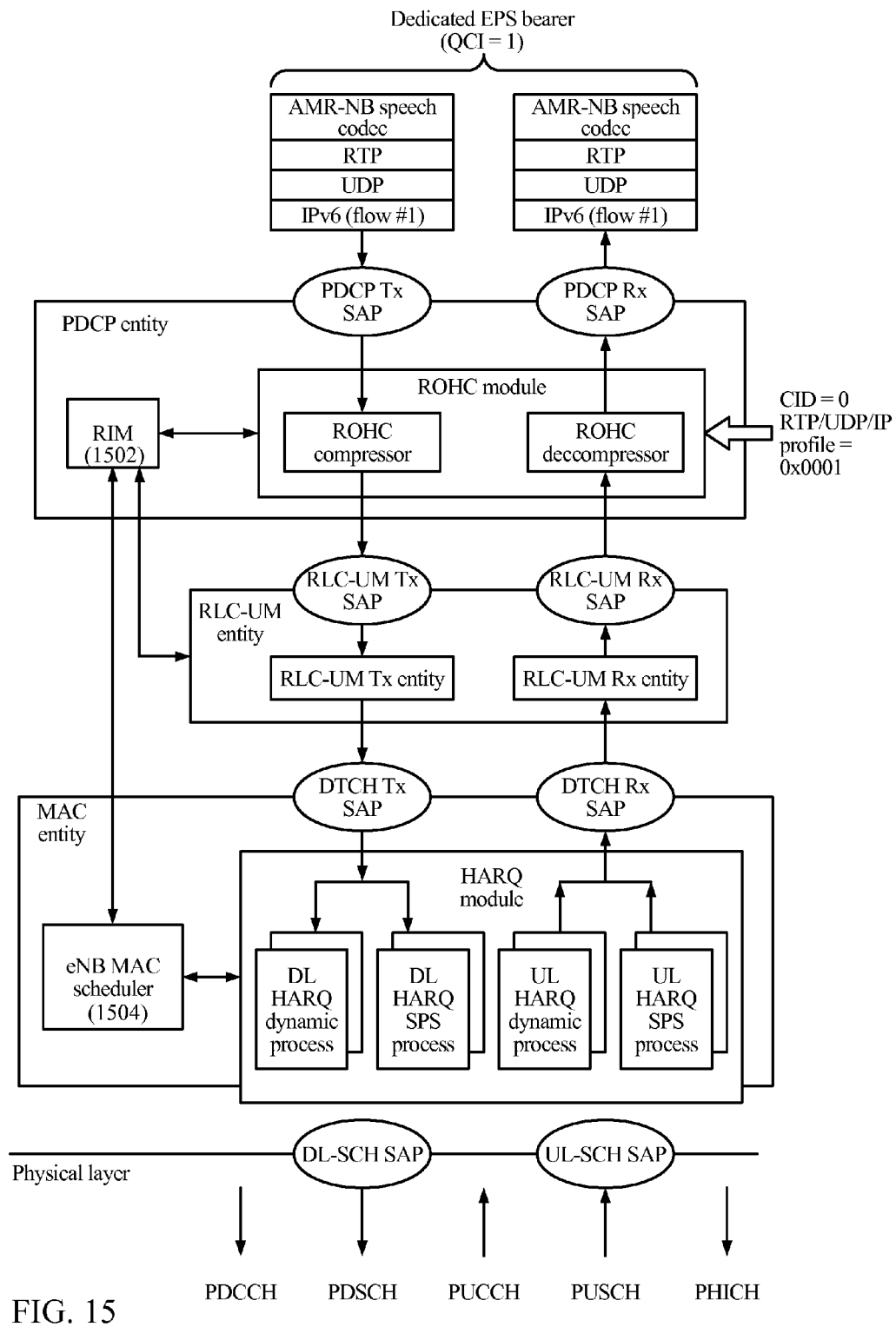
FIG. 15 depicts the user plane architecture with RIM.

FIG. 15 illustrates a simplified eNB user plane architecture that highlights the ROHC Interface Module (RIM) 1502. The RIM 1502 may be used to implement both uplink and downlink SPS activation and deactivation.

One LTE VoIP radio bearer is illustrated in FIG. 15. RTCP may be turned off by giving it 0 kbps bandwidth during session establishment or modification via SIP and SDP. As a consequence, the LTE VoIP radio bearer supports only one traffic flow comprising one payload type and only one ROHC context (e.g., CID=0) in the eNB ROHC module. A radio bearer represents the air-interface portion of the entire dedicated EPS bearer. In FIG. 15 the dedicated EPS bearer has QCI=1, which is conversational class quality of service (QoS).

TABLE 1

| Primitive | Contents | Description |
| --- | --- | --- |
| MAC-ActivateUplinkSPS-Req | SPS C-RNTI, logical channel identity, periodicity, PDCP PDU size | Used by RIM to request activation of uplink SPS |
| MAC-ActivateUplinkSPS-Resp | SPS C-RNTI, logical channel identity | Used by eNB MAC scheduler to confirm activation of uplink SPS |
| MAC-ModifyUplinkSPS-Req | SPS C-RNTI, logical channel identity, periodicity, PDCP PDU size | Used by RIM to request modification of uplink SPS that is currently 'activated' |
| MAC-ModifyUplinkSPS-Resp | SPS C-RNTI, logical channel identity | Used by eNB MAC scheduler to confirm modification of uplink SPS |
| MAC-DeactivateUplinkSPS-Req | SPS C-RNTI, logical channel identity | Used by RIM to request deactivation of uplink SPS |
| MAC-DeactivateUplinkSPS-Resp | SPS C-RNTI, logical channel identity | Used by eNB MAC scheduler to confirm deactivation of uplink SPS |

The RIM 1502 interfaces with the MAC scheduler 1504 using three request primitives and three response primitives as shown in Table 1. These interfaces may be used to activate and inactivate both uplink and downlink SPS operation.

TABLE 2

| Primitive | Contents | Description |
| --- | --- | --- |
| MAC-ActivateDownlinkSPS-Req | SPS C-RNTI, logical channel identity, periodicity, PDCP PDU size | Used by RIM to request activation of downlink SPS |
| MAC-ActivateDownlinkSPS-Resp | SPS C-RNTI, logical channel identity | Used by eNB MAC scheduler to confirm activation of downlink SPS |
| MAC-ModifyDownlinkSPS-Req | SPS C-RNTI, logical channel identity, periodicity, PDCP PDU size | Used by RIM to request modification of downlink SPS that is currently 'activated' |
| MAC-ModifyDownlinkSPS-Resp | SPS C-RNTI, logical channel identity | Used by eNB MAC scheduler to confirm modification of downlink SPS |
| MAC-DeactivateDownlinkSPS-Req | SPS C-RNTI, logical channel identity | Used by RIM to request deactivation of downlink SPS |
| MAC-DeactivateDownlinkSPS-Resp | SPS C-RNTI, logical channel identity | Used by eNB MAC scheduler to confirm deactivation of downlink SPS |

Table 2 illustrates the RIM interfaces with the eNB MAC scheduler using three request primitives and three response primitives in order to activate, modify, and deactivate downlink SPS.

The request primitives that modify the uplink and downlink SPS are needed if SPS can be activated during a "silence period" 904 and not only during a "talk period," which would require a change in the MAC TBS from 328 bits (and 2 PRBs) to 120 bits (and 1 PRB). The request primitives may also be used if the operator wishes to activate uplink and downlink SPS during a "talk period" 902 when the eNB decompressor (which is operating in either U or O-mode) is in the NC or SC state and the compressor (which is also operating in either U or O-mode) is in the IR or FO state. This state occurs before maximum header compression is achieved and requires a change in the MAC TBS from 328 bits (and 2 PRBs) to 776 bits (and 5 PRBs).

TABLE 3

| Primitive | Contents | Description |
| --- | --- | --- |
| MAC-DeactivateUplinkSPS-Ind | SPS C-RNTI, logical channel identity | Used by eNB MAC scheduler to indicate deactivation of uplink SPS |
| MAC-DeactivateDownlinkSPS-Ind | SPS C-RNTI, logical channel identity | Used by eNB MAC scheduler to indicate deactivation of downlink SPS |

Table 3 depicts the eNB MAC scheduler and its interfaces with the RIM. These interfaces are in the form of two indication primitives that are used to update the state of uplink and downlink SPS.

TABLE 4

| Primitive | Contents | Description |
| --- | --- | --- |
| RLC-UM-ActivateDownlinkSPS-Ind | SPS C-RNTI, DRB identity, logical channel identity, periodicity, PDCP PDU size | Used by RIM to indicate activation of downlink SPS |
| RLC-UM-ModifyDownlinkSPS-Ind | SPS C-RNTI, DRB identity, logical channel identity, periodicity, PDCP PDU size | Used by RIM to indicate modification of downlink SPS that is currently 'activated' |
| RLC-UM-DeactivateDownlinkSPS-Ind | SPS C-RNTI, DRB identity, logical channel identity | Used by RIM to indicate deactivation of downlink SPS |

Table 4 shows how the RIM may interface with the eNB RLC-UM entity via three indication primitives to instruct the eNB RLC-UM entity not to segment or concatenate the PDCP PDU (which may be identified by PDCP PDU size) for which the downlink SPS is currently activated. To provide the flexibility to handle the instance where the PDCP PDU size of an RTCP packet is the same size as a PDCP PDU of an RTP packet, the eNB RLC-UM entity may need to employ heuristics that allow determination of whether the PDCP PDU can be segmented or concatenated and whether or not to send the resulting RLC-UM PDU to the eNB MAC scheduler for dynamic scheduling or SPS.

Certain embodiments provide for SPS activation during a silence period. Currently, per the 3GPP specifications, either uplink or downlink SPS may be activated when the eNB ROHC decompressor is in the FC state and the compressor in the SO state; however, this approach is suboptimal. This occurs because the periodicity of SID frames 910 is 160 milliseconds and AMR speech frames 908 is 20 milliseconds. While the size of the SPS resource allocation can be changed using "SPS" PDCCH signaling, SPS periodicity cannot be changed. Changing the SPS periodicity requires execution of the RRC Connection Reconfiguration procedure using RRC signaling, which is not desired and is generally avoided when possible.

Some embodiments provide that the RRC protocol may be changed to configure uplink and downlink periodicity for a UE. The semiPersistSchedIntervalUL may be set to 20 milliseconds and the semiPersistSchedIntervalDL is also set to 20 milliseconds. The embodiment requires the addition of two new parameters: semiPersistSchedIntervalUL-SID which is set to 160 milliseconds and semiPersistSchedIntervalDL-SID which is set to 160 milliseconds.

Additionally, a 1-bit field, called "P", may be added to the "SPS" PDCCH that activates both uplink and downlink SPS. If P=0, the periodicity is determined by the parameter semiPersistSchedIntervalUL for uplink SPS activation and semiPersistScheduIntervalDL for downlink SPS activation. If P=1, the periodicity is determined by the parameter semiPersistSchedIntervalUL-SPS for uplink SPS activation and semiPersistSchedInterval-DL-SPS for downlink SPS activation.

Some embodiments provide for activating and deactivating SPS in the eNB ROHC module in the context of a multi-party or conference call. A multi-party call may be initiated when UE 1 and UE 2 are engaged in a two-way call. RTCP for both parties is turned on, if the call is occurring on an LTE network. In an LTE network, RTCP may be turned off for speech-only sessions. As a result, the LTE VoIP dedicated EPS bearer for each UE typically supports only one traffic flow, an RTP, comprising one payload type, as depicted in FIG. 15.

UE 1 may determine that a multi-party call should be initiated. Before an additional party can be added, UE 1 puts UE 2 on hold. At this point, in an LTE system, the RTCP must be turned on to provide link "aliveness" information.

Figure 16:
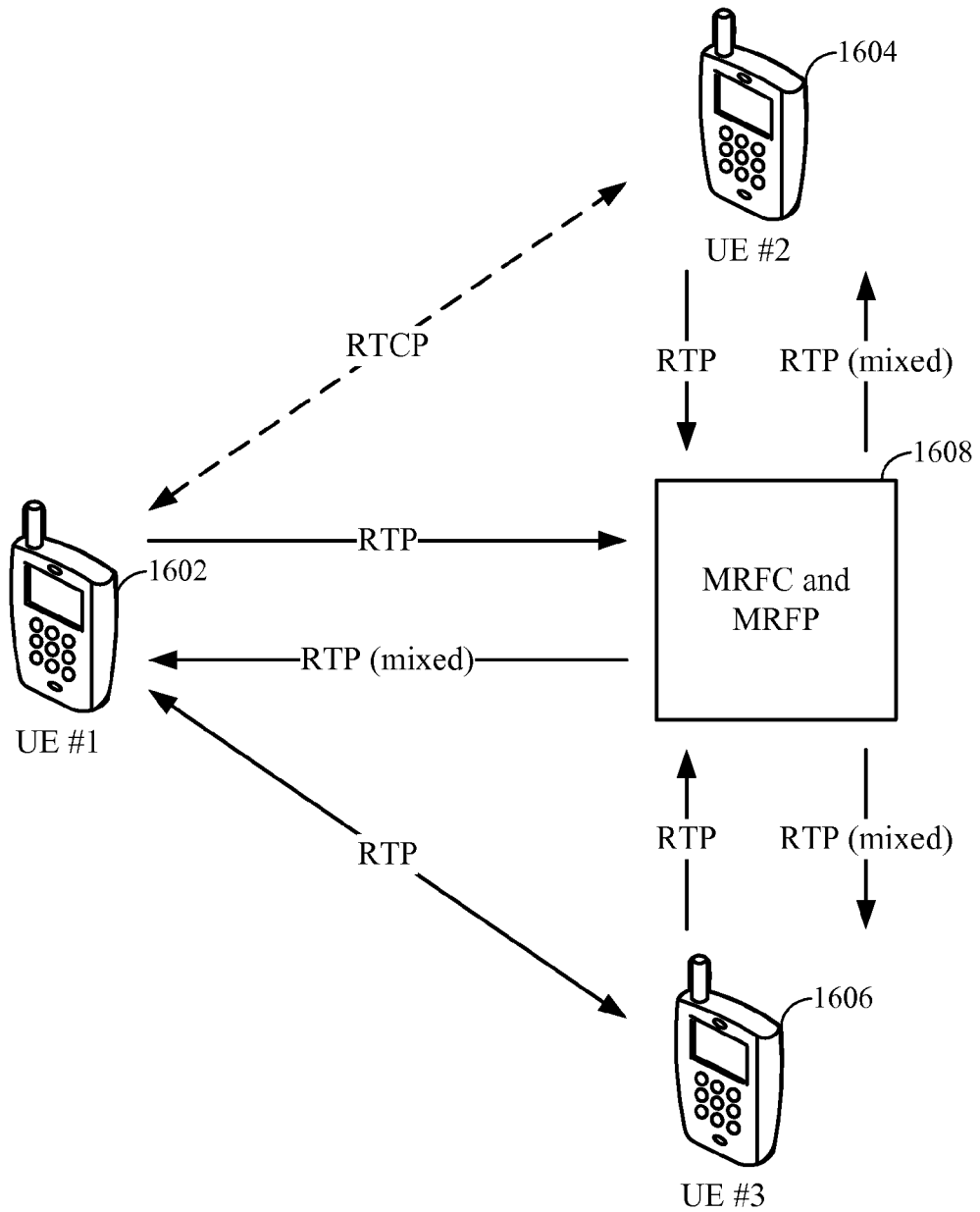
FIG. 16 depicts a multi-party call according to an embodiment of the invention.
Figure 17:
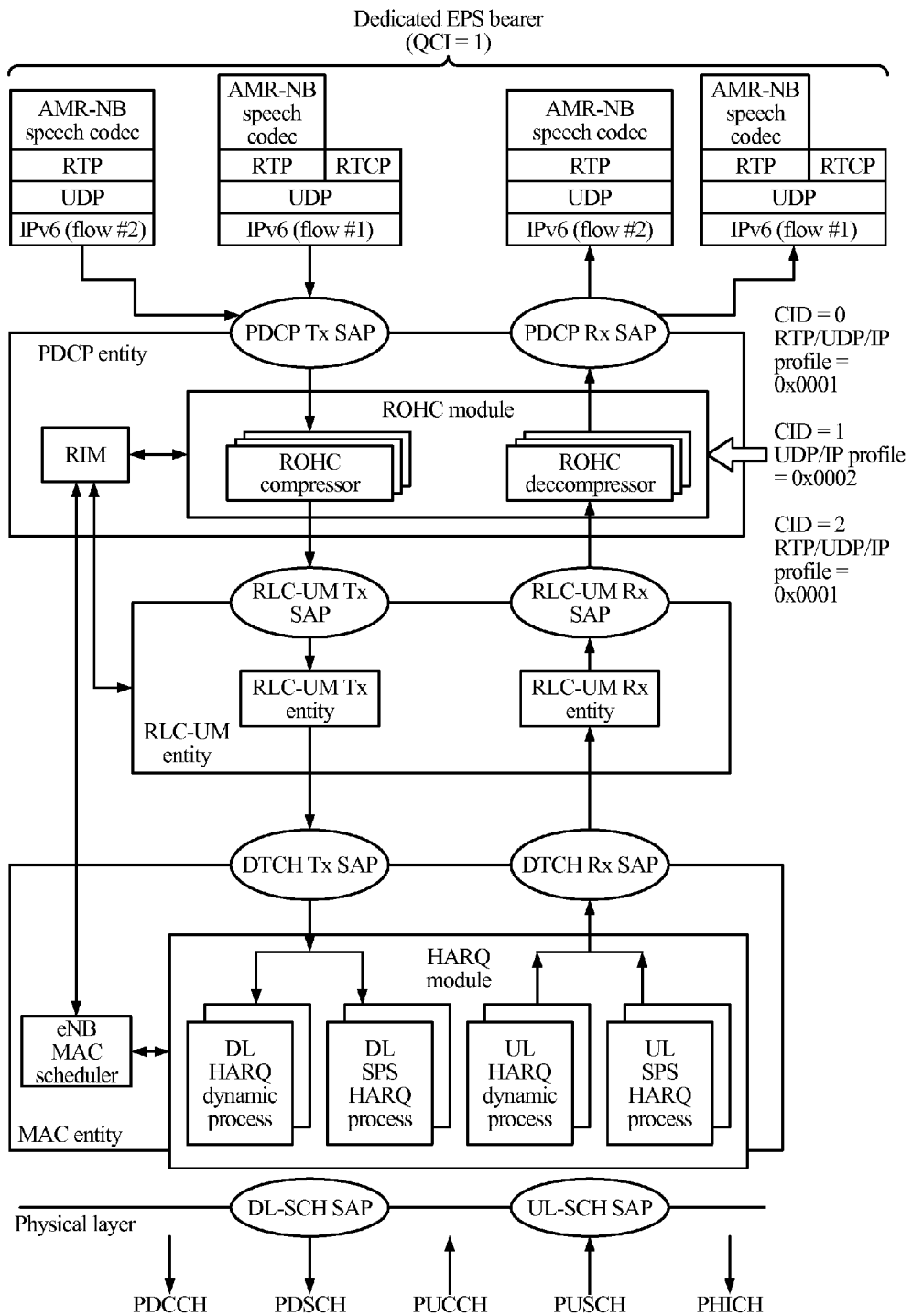
FIG. 17 illustrates an eNB User Plane Architecture with RIM (two traffic flows, each comprising one payload type).

The next step in the multi-party call requires that UE 1 initiate a session toward UE 3 and obtain permission from UE 3 to participate in the multi-party call. At this point, the LTE VoIP dedicated EPS bearer for UE 1 must typically support two traffic flows, an RTCP flow to and from UE 2 and an RTP flow to and from UE 3, with each traffic flow comprising one payload type, as illustrated in FIGS. 16 and 17. Assuming that ROHC profile for UDP/IP header compression is used for RTCP, there are now three ROHC contexts, CID=0, 1, and 2 in the eNB ROHC module and the UE 1602 ROHC module.

UE 1602 then establishes the conference or multi-party call using the MRFC and MRFP 1608 and moves the original sessions with UE 1604 and UE 1606 over to the MRFC and MRFP 1608. At this point, the LTE VoIP dedicated EPS bearers for UE 1602, UE 1604, and UE 1606 again support only one traffic flow, an RTP flow that comprises one payload type, since the media streams are mixed via the MRFP.

In operation, the SPS activating and deactivating method in the eNB ROHC module may handle the multiple traffic flow scenario as described below.

If the uplink SPS is currently activated, that is the eNB ROHC decompressor is in the FC state for CID=0 and AMR speech frames 908 were being received prior to being put on hold to establish the multi-party call, then the uplink SPS may be deactivated as the eNB ROHC decompressor is in the NC state for CID=2.

If the downlink SPS is currently activated, that is the eNB ROHC compressor is in the SO state for CID=0 and AMR speech frames 908 were being transmitted before being put on hold to establish the multi-party call, then the downlink SPS may be deactivated since the eNB ROHC decompressor is in the IR state for CID=2.

Some embodiments provide for SPS in conjunction with Dual Tone Multi-Frequency (DTMF) operation. For a UE operating in an LTE network the UE and the IMS may be required to support DTMF operation. A speech only session, that is, a session with the RTCP turned off, may be configured in conjunction with DTMF events during session establishment or modification using SIP and SDP. Typically, only the UE sends DTMF events, but because of the nature of the SDP offer and answer model, provisions must be made for the UE to receive DTMF events.

Figure 18:
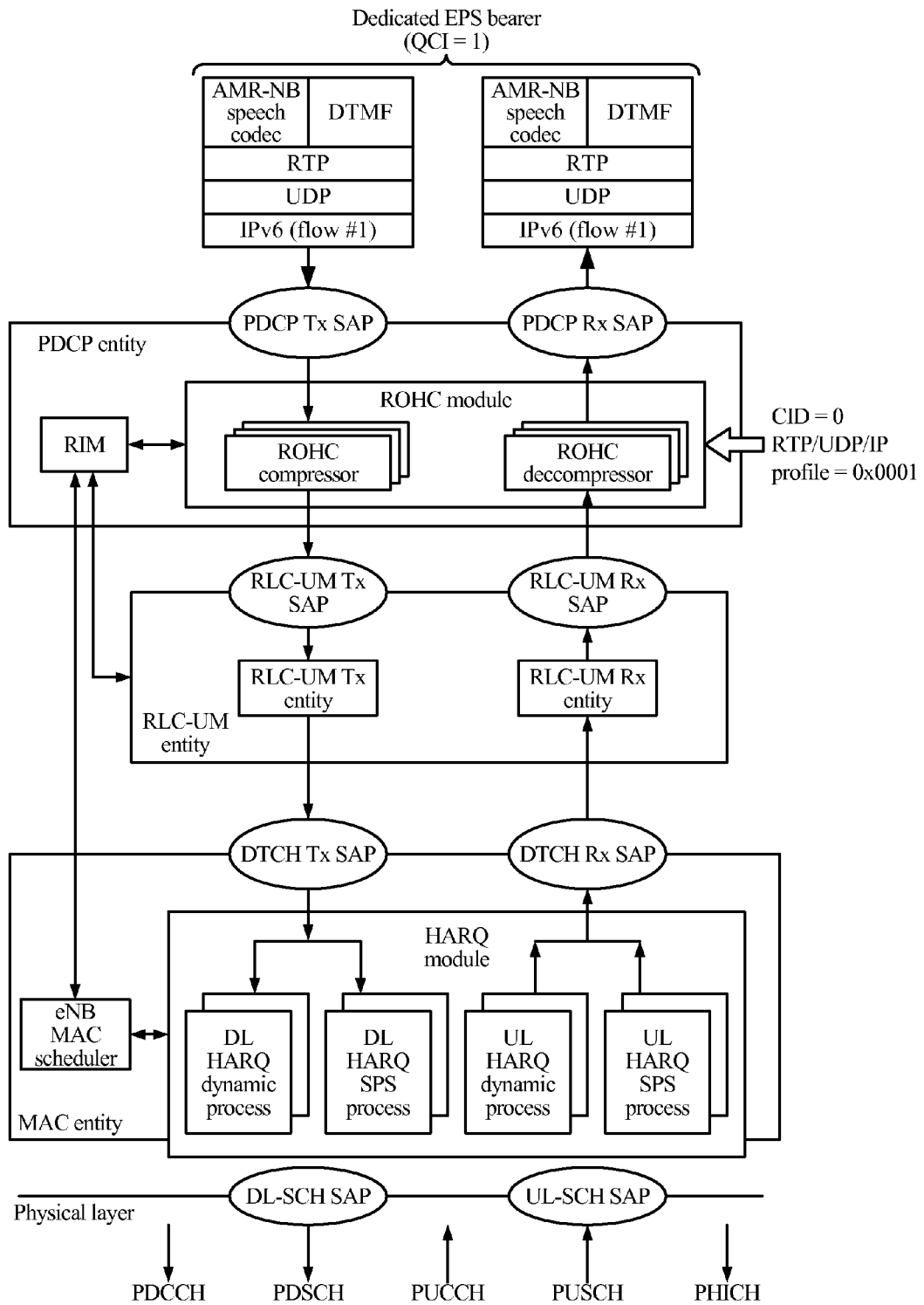
FIG. 18 illustrates an eNB User Plane Architecture with RIM (one traffic flow comprising two payload types).

FIG. 18 illustrates simultaneous support of a speech only session and DTMF events. Such simultaneous support requires that the LTE VoIP dedicated EPS bearer may need to support one traffic flow that comprises two payload types and one ROHC context (e.g., CID=0) in the eNB ROHC module.

The SPS activation and deactivation algorithm in the eNB ROHC module handles the DTMF event scenario in one embodiment. The embodiment may provide that the uplink RTP packets that contain the specific payload type "DTMF events" are treated in the same manner as uplink RTP packets containing the payload type "AMR speech codec," where the payload is a SID frame 910. In this situation, the uplink SPS is deactivated.

Downlink RTP packets containing the payload type "DTMF events" may be treated in the same manner as downlink RTP packets that contain the payload type "AMR speech codec" where the payload is a SID frame 910. In this situation, the downlink SPS is deactivated.

The DTMF functionality may also handle the situation where the PDCP PDU size of an RTP packet containing an AMR speech frame 908 or SID frame 910 is the same size as a PDCP PDU of an RTP packet containing a DTMF event. The methodology used may be the same as for the ROHC interface module discussed above.

Certain embodiments provide a method and apparatus for wireless communications. In some embodiments, the method comprises determining an operational state of a header compressor or a header decompressor. Determining the operational state of the header compressor or the header decompressor may include determining a transition between different operational states associated with the header compressor. Determining the operational state of the header compressor or the header decompressor may include determining a transition between different operational states associated with the header decompressor.

In some embodiments, the method comprises changing a persistent scheduling mode in response to a change in the operational state of the header compressor. Changing the persistent scheduling mode may comprise activating uplink persistent scheduling when the operational state of the header compressor changes from a first order state to a second order state. Changing the persistent scheduling mode may comprise deactivating the uplink persistent scheduling when the operational state of the header compressor exits the second order state. Changing the persistent scheduling mode may comprise activating downlink persistent scheduling when the operational state of the header decompressor changes from a static context state to a full context state. Changing the persistent scheduling mode may comprise deactivating the downlink persistent scheduling mode when the operational state of the header decompressor enters a no context state.

In some embodiments, the persistent scheduling mode is changed during a talk period, the talk period corresponding to the generation of a speech frame by a codec. In some embodiments, the persistent scheduling mode is changed when a silence descriptor is generated by a codec. In some embodiments, changing the persistent scheduling mode comprises activating the persistent scheduling mode. Activating persistent scheduling mode may include determining a fixed set of recurring resource blocks, and determining a periodicity of the persistent scheduling mode.

In some embodiments, changing the persistent scheduling mode may comprise deactivating the persistent scheduling mode. Deactivating the persistent scheduling mode may include de-allocating the fixed set of recurring resource blocks when a packet size is larger or smaller than the fixed set of recurring resource blocks and a periodicity of the allocation changes.

In some embodiments, the fixed set of recurring resource blocks may be modified when a packet size is larger or smaller than the fixed set of recurring resource blocks and a periodicity of the allocation changes. In some embodiments, only uplink resource blocks are de-allocated or only downlink resource blocks are de-allocated.

In certain embodiments, data generated by a codec or dual tone multi-function events is communicated using the fixed set of recurring resource blocks. The semi-persistent scheduling may be de-activated after a conference call is established. The semi-persistent scheduling may be deactivated after a conference call is established by deactivating uplink semi-persistent scheduling when speech frames were being received before the conference call was established. The semi-persistent scheduling may be deactivated after a conference call is established by deactivating the semi-persistent scheduling after a conference call is established includes deactivating downlink semi-persistent scheduling when speech frames were being transmitted before the conference call was established.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications comprising:
   determining, by a network device, an operational mode and an operational state of a Robust Header Compression (ROHC) compressor or a ROHC decompressor; and
   changing, by the network device, a semi-persistent scheduling (SPS) mode of a radio bearer in response to a change in the operational state of the ROHC compressor or ROHC decompressor, wherein
   determining the operational mode and the operational state comprises determining a transition between different operational states associated with the ROHC compressor, and
   changing the SPS mode comprises activating uplink semi-persistent scheduling when the operational state of the ROHC compressor changes from a first-order state to a second-order state and deactivating the uplink semi-persistent scheduling when the operational state of the ROHC compressor exits the second-order state.

2. The method of claim 1, wherein determining the operational mode and operational state of the ROHC compressor or the ROHC decompressor comprises:
   determining, by the network device, a transition between different operational states associated with the ROHC decompressor.

3. The method of claim 2, wherein changing the SPS mode comprises:
   activating, by the network device, downlink semi-persistent scheduling when the operational state of the ROHC decompressor changes from a static context (SC) state to a full context (FC) state.

4. The method of claim 3, wherein changing the SPS mode comprises:
   deactivating, by the network device, the downlink semi-persistent scheduling when the operational state of the ROHC decompressor enters a no context (NC) state.

5. The method of claim 1, wherein the SPS mode is changed during a talk period, the talk period corresponding to a generation of a speech frame by a codec.

6. The method of claim 1, wherein the SPS mode is changed when a silence descriptor (SID) is generated by a codec.

7. The method of claim 1, wherein changing the SPS mode comprises:
   activating the SPS mode, wherein activating the SPS mode includes:
     determining a fixed set of recurring allocated resource blocks; and
     determining a periodicity of the SPS mode.

8. The method of claim 7, wherein changing the SPS mode comprises:
   deactivating the SPS mode, wherein deactivating the SPS mode comprises:
     de-allocating the fixed set of recurring allocated resource blocks when a packet size is larger or smaller than a size of the fixed set of recurring allocated resource blocks and a periodicity of allocation changes.

9. The method of claim 8, further comprising:
modifying the fixed set of recurring allocated resource blocks when the packet size is larger or smaller than the size of the fixed set of recurring allocated resource blocks and the periodicity of allocation changes.

10. The method of claim 8, wherein only uplink resource blocks are de-allocated.

11. The method of claim 8, wherein only downlink resource blocks are de-allocated.

12. The method of claim 7, further comprising:
communicating data generated by a codec or dual tone multi-function (DTMF) events using the fixed set of recurring allocated resource blocks.

13. The method of claim 1, wherein changing the SPS mode comprises:
deactivating semi-persistent scheduling between the network device and a second network device after a conference call is established between the network devices, the second network device and at least a third network device.

14. The method of claim 13, wherein deactivating the semi-persistent scheduling after a conference call is established comprises:
deactivating uplink semi-persistent scheduling when speech frames were being received by the network device before the conference call is established.

15. The method of claim 13, wherein deactivating the semi-persistent scheduling after a conference call is established comprises:
deactivating downlink semi-persistent scheduling when speech frames were being transmitted by the network device before the conference call is established.

16. An apparatus for wireless communication, comprising:
means for determining an operational mode and an operational state of a Robust Header Compression (ROHC) compressor or a ROHC decompressor; and
means for changing a semi-persistent scheduling (SPS) mode of a radio bearer in response to a change in the operational state of the ROHC compressor or ROHC decompressor, wherein
the means for determining the operational mode and the operational state determines a transition between different operational states associated with the ROHC compressor, and
the means for changing the SPS mode activates uplink semi-persistent scheduling when the operational state of the ROHC compressor changes from a first-order state to a second-order state and deactivates the uplink semi-persistent scheduling when the operational state of the ROHC compressor exits the second order state.

17. The apparatus of claim 16, wherein the means for determining the operational mode and operational state of the ROHC compressor or the ROHC decompressor determines a transition between different operational states associated with the ROHC decompressor.

18. The apparatus of claim 17, wherein the means for changing the SPS mode activates downlink semi-persistent scheduling when the operational state of the ROHC decompressor changes from a static context (SC) state to a full context (FC) state.

19. The apparatus of claim 18, wherein the means for changing the SPS mode deactivates the downlink semi-persistent scheduling when the operational state of the ROHC decompressor enters a no context (NC) state.

20. The apparatus of claim 16, wherein the SPS mode is changed during a talk period, the talk period corresponding to a generation of a speech frame by a codec.

21. The apparatus of claim 16, wherein the SPS mode is changed when a silence descriptor (SID) is generated by a codec.

22. The apparatus of claim 16, wherein the means for changing the SPS mode activates the SPS mode, wherein the SPS mode is activated by:
determining a fixed set of recurring allocated resource blocks; and
determining a periodicity of the SPS mode.

23. The apparatus of claim 22, wherein the means for changing the SPS mode deactivates the SPS mode,
wherein the SPS mode is deactivated by de-allocating the fixed set of recurring allocated resource blocks when a packet size is larger or smaller than a size of the fixed set of recurring allocated resource blocks and a periodicity of allocation changes.

24. The apparatus of claim 23, further comprising:
means for modifying the fixed set of recurring allocated resource blocks when the packet size is larger or smaller than the size of the fixed set of recurring allocated resource blocks and the periodicity of allocation changes.

25. The apparatus of claim 23, wherein only uplink resource blocks are de-allocated.

26. The apparatus of claim 23, wherein only downlink resource blocks are de-allocated.

27. The apparatus of claim 16, wherein changing the SPS mode comprises
deactivating semi-persistent scheduling between a network device and a second network device after a conference call is established between the network devices, the second network device and at least a third network device.

28. The apparatus of claim 27, wherein the deactivating the semi-persistent scheduling after a conference call is established deactivates uplink semi-persistent scheduling when speech frames were being received by the network device before the conference call is established.

29. The apparatus of claim 27, wherein the deactivating the semi-persistent scheduling after a conference call is established deactivates downlink semi-persistent scheduling when speech frames were being transmitted by the network device before the conference call is established.

30. An apparatus for wireless communication, comprising:
a processing system configured to:
determine an operational mode and an operational state of a Robust Header Compression (ROHC) compressor or a ROHC decompressor; and
change a semi-persistent scheduling (SPS) mode of a radio bearer in response to a change in the operational state of the ROHC compressor or ROHC decompressor, wherein
determining the operational mode and the operational state comprises determining a transition between different operational states associated with the ROHC compressor, and
changing the SPS mode comprises activating uplink semi-persistent scheduling when the operational state of the ROHC compressor changes from a first-order state to a second-order state and deactivating the uplink semi-persistent scheduling when the operational state of the ROHC compressor exits the second-order state.

31. The apparatus of claim 30, wherein determining the operational mode and the operational state of the ROHC compressor or the ROHC decompressor comprises:

determining a transition between different operational states associated with the ROHC decompressor.

32. The apparatus of claim 31, wherein changing the SPS mode comprises:
activating downlink semi-persistent scheduling when the operational state of the ROHC decompressor changes from a static context (SC) state to a full context (FC) state.

33. The apparatus of claim 32, wherein changing the SPS mode comprises:
deactivating the downlink semi-persistent scheduling when the operational state of the ROHC decompressor enters a no context (NC) state.

34. The apparatus of claim 30, wherein the SPS mode is changed during a talk period, the talk period corresponding to a generation of a speech frame by a codec.

35. The apparatus of claim 30, wherein the SPS mode is changed when a silence descriptor (SID) is generated by a codec.

36. The apparatus of claim 30, wherein changing the SPS mode comprises:
activating the SPS mode, wherein activating the SPS mode includes:
determining a fixed set of recurring allocated resource blocks; and
determining a periodicity of the SPS mode.

37. The apparatus of claim 36, wherein changing the SPS mode comprises:
deactivating the SPS mode, wherein deactivating the SPS mode comprises:
de-allocating the fixed set of recurring allocated resource blocks when a packet size is larger or smaller than a size of the fixed set of recurring allocated resource blocks and a periodicity of allocation changes.

38. The apparatus of claim 37, wherein the processing system is further configured to:
modify the fixed set of recurring allocated resource blocks when the packet size is larger or smaller than a size of the fixed set of recurring allocated resource blocks and the periodicity of allocation changes.

39. The apparatus of claim 37, wherein only uplink resource blocks are de-allocated.

40. The apparatus of claim 37, wherein only downlink resource blocks are de-allocated.

41. The apparatus of claim 36, wherein the processing system is further configured to:
communicate data generated by a codec or dual tone multi-function (DTMF) events using the fixed set of recurring allocated resource blocks.

42. The apparatus of claim 30, wherein changing the SPS mode comprises:
deactivating semi-persistent scheduling between a network device and a second network device after a conference call is established between the network devices, the second network device and at least a third network device.

43. The apparatus of claim 42, wherein deactivating the semi-persistent scheduling after a conference call is established comprises:
deactivating uplink semi-persistent scheduling when speech frames were being received by the network device before the conference call is established.

44. The apparatus of claim 42, wherein deactivating the semi-persistent scheduling after a conference call is established comprises:
deactivating downlink semi-persistent scheduling when speech frames were being transmitted by the network device before the conference call is established.

45. A computer program product, comprising:
a non-transitory computer-readable medium comprising code for:
determining an operational mode and an operational state of a Robust Header Compression (ROHC) compressor or a ROHC decompressor; and
changing a semi-persistent scheduling (SPS) mode of a radio bearer in response to a change in the operational state of the ROHC compressor or ROHC decompressor, wherein
determining the operational mode or the operational state of the ROHC compressor or the ROHC decompressor comprises determining a transition between different operational states associated with the ROHC compressor, and
changing the SPS mode comprises activating uplink semi-persistent scheduling when the operational state of the ROHC compressor changes from a first-order state to a second-order state and deactivating the uplink semi-persistent scheduling when the operational state of the ROHC compressor exits the second-order state.

46. The computer program product of claim 45, wherein the code for determining the operational mode and the operational state of the ROHC compressor or the ROHC decompressor determines a transition between different operational states associated with the ROHC decompressor.

47. The computer program product of claim 46, wherein the code for changing the SPS mode activates downlink semi-persistent scheduling when the operational state of the ROHC decompressor changes from a static context (SC) state to a full context (FC) state.

48. The computer program product of claim 47, wherein the code for changing the SPS mode deactivates the downlink semi-persistent scheduling when the operational state of the ROHC decompressor enters a no context (NC) state.

49. The computer program product of claim 45, wherein the SPS mode is changed during a talk period, the talk period corresponding to a generation of a speech frame by a codec.

50. The computer program product of claim 45, wherein the SPS mode is changed when a silence descriptor (SID) is generated by a codec.

51. The computer program product of claim 45, wherein the code for changing the SPS mode activates the SPS mode by:
determining a fixed set of recurring allocated resource blocks; and
determining a periodicity of the SPS mode.

52. The computer program product of claim 51, wherein the code for changing the SPS mode deactivates the SPS mode by de-allocating the fixed set of recurring allocated resource blocks when a packet size is larger or smaller than a size of the fixed set of recurring allocated resource blocks and a periodicity of allocation changes.

53. The computer program product of claim 52, wherein the non-transitory computer-readable medium further comprises code for:
modifying the fixed set of recurring allocated resource blocks when the packet size is larger or smaller than the size of the fixed set of recurring allocated resource blocks and the periodicity of allocation changes.

54. The computer program product of claim 52, wherein only uplink resource blocks are de-allocated.

55. The computer program product of claim 52, wherein only downlink resource blocks are de-allocated.

56. The computer program product of claim 51, wherein the non-transitory computer-readable medium further comprises code for:

communicating data generated by a codec or dual tone multi-function (DTMF) events using the fixed set of recurring allocated resource blocks.

57. The computer program product of claim 45, wherein the non-transitory computer-readable medium further comprises code for:

deactivating semi-persistent scheduling between a network device and a second network device after a conference call is established between the network devices, the second network device and at least a third network device.

58. The computer program product of claim 57, wherein the semi-persistent scheduling is deactivated after a conference call is established by deactivating uplink semi-persistent scheduling when speech frames were being received by the network device before the conference call is established.

59. The computer program product of claim 57, wherein the semi-persistent scheduling is deactivated after a conference call is established by deactivating downlink semi-persistent scheduling when speech frames were being transmitted by the network device before the conference call is established.

\* \* \* \* \*